(12) United States Patent
Warrick

(10) Patent No.: US 10,887,469 B2
(45) Date of Patent: *Jan. 5, 2021

(54) DATA GATE APPARATUS FOR INTEGRATING FUNCTIONALITIES OF AN INTERFACE FORMAT INTO A PLURALITY OF SERVICES AND METHOD THEREOF

(71) Applicant: Bullhead Innovations Ltd., Calgary (CA)

(72) Inventor: Peter S. Warrick, Calgary (CA)

(73) Assignee: Bullhead Innovations Ltd., Calgary (CA)

(*) Notice: Subject to any disclaimer, the term of this patent is extended or adjusted under 35 U.S.C. 154(b) by 0 days.

This patent is subject to a terminal disclaimer.

(21) Appl. No.: 16/699,466

(22) Filed: Nov. 29, 2019

(65) Prior Publication Data
US 2020/0099794 A1 Mar. 26, 2020

Related U.S. Application Data

(60) Continuation of application No. 16/390,637, filed on Apr. 22, 2019, now Pat. No. 10,542,155, which is a (Continued)

(51) Int. Cl.
*H04M 11/00* (2006.01)
*G10L 13/04* (2013.01)
(Continued)

(52) U.S. Cl.
CPC ......... *H04M 11/007* (2013.01); *G05B 19/042* (2013.01); *G06F 3/16* (2013.01);
(Continued)

(58) Field of Classification Search
CPC .... H04M 11/00; H04M 11/007; H04M 11/10; H04M 2207/203; H04M 2242/30; G06Q 50/12
(Continued)

(56) References Cited

U.S. PATENT DOCUMENTS 8,250,601 B2 8/2012 King
8,732,753 B2 5/2014 Warrick
(Continued)

OTHER PUBLICATIONS

Daniel Eran Dilger, "iOS 10 cracks open Apple's Siri voice assistance to third party apps", article dated Jun. 28, 2016, downloaded from https://appleinsider.com/articles/16/06/28/ios-10-cracks-open-apples-siri-voice-assistance-to-third-party-apps on Dec. 11, 2018.

*Primary Examiner* — Melur Ramakrishnaiah
(74) *Attorney, Agent, or Firm* — ATMAC Patent Services Ltd.; Andrew T. MacMillan

(57) ABSTRACT

A data gate apparatus for integrating functionalities of an interface format into a plurality of services. The data gate comprises a storage device, a communication interface and a processor coupled to the storage device and the communication interface. The processor detects a device supporting a first interface format that is different than the interface formats stored in the storage device. The processor learns the first interface format by receiving data function in the first interface format and associating a field in the data function with a variable representing information of a particular type. The processor verifies that the first interface format has been successfully learnt by generating a message in the first interface format and sending the message to the device. The processor receives a response to the message and parses the response to thereby confirm that the first interface format is functional and integrable into the plurality of services.

20 Claims, 10 Drawing Sheets

Related U.S. Application Data division of application No. 15/834,961, filed on Dec. 7, 2017, now Pat. No. 10,313,531.

(60) Provisional application No. 62/433,693, filed on Dec. 13, 2016.

(51) Int. Cl.
| | |
|---|---|
| *G06F 3/16* | (2006.01) |
| *G10L 15/26* | (2006.01) |
| *H04L 12/66* | (2006.01) |
| *G05B 19/042* | (2006.01) |
| *G06Q 50/12* | (2012.01) |
| *H04M 11/10* | (2006.01) |

(52) U.S. Cl.
CPC .............. *G06F 3/167* (2013.01); *G10L 13/04* (2013.01); *G10L 15/26* (2013.01); *H04L 12/66* (2013.01); *H04M 11/00* (2013.01); *G05B 2219/2642* (2013.01); *G06Q 50/12* (2013.01); *H04M 11/10* (2013.01); *H04M 2207/203* (2013.01); *H04M 2242/30* (2013.01)

(58) Field of Classification Search
USPC ................ 379/102.01, 102.02, 93.12; 705/2; 709/220
See application file for complete search history.

(56) References Cited

U.S. PATENT DOCUMENTS

| | | | |
|---|---|---|---|
| 9,009,259 B2 | 4/2015 | Iwaniszyn | |
| 9,060,197 B2 | 6/2015 | Warrick et al. | |
| 9,106,796 B2 | 8/2015 | King | |
| 9,137,281 B2 | 9/2015 | Warrick et al. | |
| 9,185,178 B2 | 11/2015 | Peng et al. | |
| 9,369,748 B2 | 6/2016 | Warrick et al. | |
| 9,456,047 B2 | 9/2016 | Peng et al. | |
| 9,462,000 B2 | 10/2016 | Hulse et al. | |
| 9,800,694 B2 | 10/2017 | Peng et al. | |
| 10,313,531 B2 | 6/2019 | Warrick | |
| 10,542,155 B2 | 1/2020 | Warrick | |
| 2004/0267567 A1 | 12/2004 | Barrera et al. | |
| 2010/0205475 A1* | 8/2010 | Ebrahimi | G06F 21/62 714/2 |
| 2014/0129453 A1 | 5/2014 | Brazell | |
| 2014/0244809 A1* | 8/2014 | Kang | H04L 67/2823 709/220 |
| 2014/0249937 A1 | 9/2014 | McNally | |
| 2015/0350017 A1 | 12/2015 | King | |
| 2015/0373123 A1 | 12/2015 | Warrick et al. | |
| 2016/0063209 A1* | 3/2016 | Malaviya | G16H 50/30 706/12 |
| 2016/0118044 A1 | 4/2016 | Bondarev et al. | |
| 2016/0179462 A1 | 6/2016 | Bjorkengren | |
| 2016/0373558 A1 | 12/2016 | Peng et al. | |
| 2018/0063292 A1 | 3/2018 | Peng et al. | |

* cited by examiner

DATA GATE APPARATUS FOR INTEGRATING FUNCTIONALITIES OF AN INTERFACE FORMAT INTO A PLURALITY OF SERVICES AND METHOD THEREOF

CROSS-REFERENCE TO RELATED APPLICATIONS

This application is a continuation of U.S. patent application Ser. No. 16/390,637 filed on Apr. 22, 2019, which is a divisional application of U.S. patent application Ser. No. 15/834,961 filed on Dec. 7, 2017, which claims the benefit of priority of U.S. Provisional Application No. 62/433,693 filed Dec. 13, 2016. All of these applications are incorporated herein by reference.

BACKGROUND OF THE INVENTION

(1) Field of the Invention

The invention pertains generally to entertainment and other electronic systems utilized at hospitality establishments such as hotels and resorts. More specifically, the invention relates to a data gate for interfacing between a plurality of different electronic systems, and a system for controlling devices within a guest room utilizing a user's voice.

(2) Description of the Related Art

One problem with hotel technology is the integration of different electronic systems. FIG. 1 shows a block diagram of the typical interconnection of different hotel systems within a hotel according to the prior art. As shown, the phone private branch exchange (PBX) system 100, Internet system 102, property management system (PMS) 104, point of sale system 106, in-room video system 108, and room control services system 110 are all directly connected with one another as needed using dedicated connections. Each of these systems needs to talk to at least one other system and some, like the PMS 104, need to talk with many separate systems. For this reason, each service needs to develop its own dedicated interfaces to communicate properly with each connected system.

The current approach illustrated in FIG. 1 is hard to manage and upgrade. Whenever a hotel brings on a new vendor, the hotel needs to make sure the new vendor system is compatible with all the other vendor systems. The installation process is therefore complex, error prone, and leads to much finger pointing about who is responsible for what.

Another problem with hotel technology is the control of in-room and other electronic devices. The first thing many hotel guests do after they have connected to a hotel's high speed internet access (HSIA) system is to turn on the in-room television (TV). The TV is usually on and tuned to the guest's channel of choice within five minutes of a guest getting into the room.

However, many guests do not enjoy using the hotel-provided TV infrared remote control. Besides being unfamiliar to the guest, the remote control can be a spawning ground for germs and a possible way to pick up a cold. Getting ill is something most people do not wish to happen while travelling. The fact that many unknown people have previously handled the remote is not appealing to the average guest.

One way to prevent the need for a guest to pick up the remote is to allow room control with voice commands. There are a few initiatives going on in the industry today around voice controlling the hotel room. Current trials typically take the form of some sort of device such as a preconfigured iPad™ being provided by the hotel in the guest room. The iPad is set up in advance by hotel staff specifically for the room in which it is placed and is intended to respond to the voice commands of the guests in that room.

The preconfigured iPad-in-the-room solution has several issues making it a non-ideal solution. First, the hotel needs to buy all these devices for every room in the hotel. These initial cost requirements are a significant barrier to entry for many hotels. Furthermore, the hotel needs to set up all the devices in the room and ensure they remain properly configured, properly cleaned, and properly updated over time. Guests will move these devices around, unplug them, perhaps even manipulate them and put unwanted software on them. Worst yet, a guest could walk out of their room with the iPad in their luggage. Additionally, guests are likely to object to the iPad in the room for privacy reasons.

In the early nineties, some hotels tried installing a full desktop computer in each guest room. One of the features of early setups was a small web camera intended to allow guests to conduct video conferences with colleagues.

The in-room computer and especially the web camera was a huge flop for a couple of reasons. For one, at that time people were starting to carry their own laptops with them more and more and these tech savvy guests wanted to use their own device. They had all the files and all the settings just as they wanted them on their own device and they knew how to use their laptop instead of having to figure out where everything was on a foreign computer. But the biggest issue was the web camera. People were concerned by the idea that they were being watched by the preinstalled web cameras. The in-room web camera was great idea with good intentions that inadvertently caused massive privacy concerns. Shortly after they were installed, they were all pulled out.

However, it seems the industry is now trying the same experiment with in-room iPads provided by the hotel in each room. It is likely many guests are going to have the same reaction that has already been discovered by the industry about other in-room technology. For one, many guests will not want to physically touch the hotel-provided iPad. It is not theirs. It is potentially dirty. It might break and they will be held responsible. But more importantly they are going to wonder what nefarious things it might be used for. An iPad has a microphone that could be listening to them. In fact, to enable voice commands, the iPad literally needs to do just that. Whether it does anything additional with the audio is unknown to the guest. It is not the guest's device. Furthermore, a hotel-provided iPad has a video camera built-in. Although not needed for voice commands, a typical guest will not trust that the camera has been effectively disabled. They will worry why there is a foreign video camera in their hotel room. They may be fearful that a nefarious individual has access to the device. Some may demand the devices be removed. Bottom line, the in-room device is not theirs, so many guests will not trust it.

BRIEF SUMMARY OF THE INVENTION

According to an exemplary embodiment of the invention there is disclosed a data gate apparatus for interfacing between a plurality of services. The data gate apparatus includes a storage device, a network interface, and a processor coupled to the storage device and the communication interface. By the processor executing software instructions loaded from the storage device, the processor is operable to learn a first interface format of a first of the services at least by receiving a first data function from the first of the services via the communication interface and identifying a field in the first data function, the field representing a position in data functions having the first interface format where information of a particular type is passed. The processor associates a variable with the field, the variable representing the information of the particular type, and store the first interface format in the storage device for future use. The processor further receives a second data function via the communication interface from the first of the services, the second data function having the first interface format. Furthermore, the processor identifies the field in the second data function according to the first interface format in the storage device, extracts a value from the field in the second data function and store the value as the variable, generates a message in a second interface format different than the first interface format and inserts the value of the variable in the message, and sends the message in the second interface format to a second of the services. In this way, the second of the services receives the value of the variable representing the information of the particular type as passed from the first of the services without the second of the services needing to understand the first interface format utilized by the first of the services.

According to an exemplary embodiment of the invention there is disclosed a system for interfacing between a plurality of services.

According to an exemplary embodiment of the invention there is disclosed a method of interfacing between a plurality of services. The method includes learning a first interface format of a first of the services at least by receiving a first data function from the first of the services via a communication interface and identifying a field in the first data function, the field representing a position in data functions having the first interface format where information of a particular type is passed. The method further includes associating a variable with the field, the variable representing the information of the particular type, and storing the first interface format in a storage device for future use. The method further includes receiving a second data function via the communication interface from the first of the services, the second data function having the first interface format, identifying the field in the second data function according to the first interface format in the storage device, extracting a value from the field in the second data function and storing the value as the variable, generating a message in a second interface format different than the first interface format and inserting the value of the variable in the message, and sending the message in the second interface format to a second of the services. In this way, the second of the services receives the value of the variable representing the information of the particular type as passed from the first of the services without the second of the services needing to understand the first interface format utilized by the first of the services.

According to an exemplary embodiment of the invention there is disclosed a non-transitory computer-readable medium for interfacing between a plurality of services. The non-transitory computer-readable medium includes computer executable instructions for interfacing between a plurality of services that when executed by a computer cause the computer to perform steps at least including learning a first interface format of a first of the services at least by receiving a first data function from the first of the services via a communication interface and identifying a field in the first data function, the field representing a position in data functions having the first interface format where information of a particular type is passed. The non-transitory computer readable medium further includes associating a variable with the field, the variable representing the information of the particular type, and storing the first interface format in a storage device for future use. The non-transitory computer readable medium further includes receiving a second data function via the communication interface from the first of the services, the second data function having the first interface format, identifying the field in the second data function according to the first interface format in the storage device, extracting a value from the field in the second data function and storing the value as the variable, generating a message in a second interface format different than the first interface format and inserting the value of the variable in the message, and sending the message in the second interface format to a second of the services. In this way, the second of the services receives the value of the variable representing the information of the particular type as passed from the first of the services without the second of the services needing to understand the first interface format utilized by the first of the services.

According to an exemplary embodiment of the invention there is disclosed a system for controlling devices in a guest room of a hospitality establishment. The system includes a user device operated by a guest of the hospitality establishment, the user device having a microphone and a network interface coupled to a computer network, a voice-to-text server coupled to the network, and a room control server coupled to the network. The user device is operable to record an audio file from the microphone and send the audio file from the user device to the voice-to-text server via the computer network. The voice-to-text server is operable to convert the audio received from the user device into a text transcript and send the text transcript back to the user device. The user device is further operable to pass the text transcript to the room control server. The room control server is operable to determine a particular room of the hospitality establishment with which the user device is currently associated. The room control server is further operable to decode the text transcript into a room control command, and the room control server is further operable to determine one or more target in-room controllable devices of the particular room to which the room control command pertains. The room control server is further operable to send one or more network messages to the one or more target in-room controllable device thereby causing the one or more target in-room controllable devices to carry out the room control command.

According to an exemplary embodiment of the invention there is disclosed a method for controlling devices in a guest room of a hospitality establishment.

According to an exemplary embodiment of the invention there is disclosed a computer server for controlling devices in a guest room of a hospitality establishment.

According to an exemplary embodiment of the invention there is disclosed an apparatus for controlling devices in a guest room of a hospitality establishment.

According to yet another exemplary embodiment of the invention there is disclosed a data gate apparatus for integrating functionalities of an interface format into a plurality of services. The data gate apparatus includes a storage device, a communication interface, and a processor coupled to the storage device and the communication interface. By the processor executing software instructions loaded from the storage device, the processor is operable to detect a first interface format of a first of the services via the communication interface. In response to determining that the first interface format is different than the interface formats stored in the storage device, the processor learns the first interface format at least by receiving a first data function from the first of the services and identifying a field in the first data function, the field representing a position in data functions having the first interface format where an information of a particular type is passed. Thereafter, the processor associates a variable with the field, the variable representing the information of the particular type, and stores the first interface format in the storage device for future use. The processor verifies that the first interface format stored in the storage device is functional at least by: installing the first interface format on the data gate, generating a message in the first interface format, and sending the message in the first interface format to the first of the services wherein the message at least causes the first of the services to send a response message to the data gate. The processor receives the response message from the first of the services via the communication interface, parses the response message to thereby confirm that the first interface format stored in the storage device is functional and integrable into the plurality of services.

According to yet another exemplary embodiment of the invention there is disclosed a method of integrating functionalities of an interface format into a plurality of services. The method includes detecting a first interface format of a first of the services and determining that the first interface format is different than the interface formats stored in a storage device. The method further includes learning the first interface format at least by receiving a first data function from the first of the services and identifying a field in the first data function, the field representing a position in data functions having the first interface format where an information of a particular type is passed, associating a variable with the field, the variable representing the information of the particular type, and storing the first interface in the storage device for future use. The method further includes verifying that the first interface format stored in the storage device is functional at least by: installing the first interface format on a data gate, generating a message in the first interface format, and sending the message in the first interface format to the first of the services wherein the message at least causes the first of the services to send a response message. The method further includes receiving the response message from the first of the services and parsing the response message to thereby confirm that the first interface format stored in the storage device is functional and integrable into the plurality of services.

These and other advantages and embodiments of the present invention will no doubt become apparent to those of ordinary skill in the art after reading the following detailed description of preferred embodiments illustrated in the various figures and drawings.

BRIEF DESCRIPTION OF THE DRAWINGS

The invention will be described in greater detail with reference to the accompanying drawings which represent preferred embodiments thereof.

DETAILED DESCRIPTION

Figure 1:
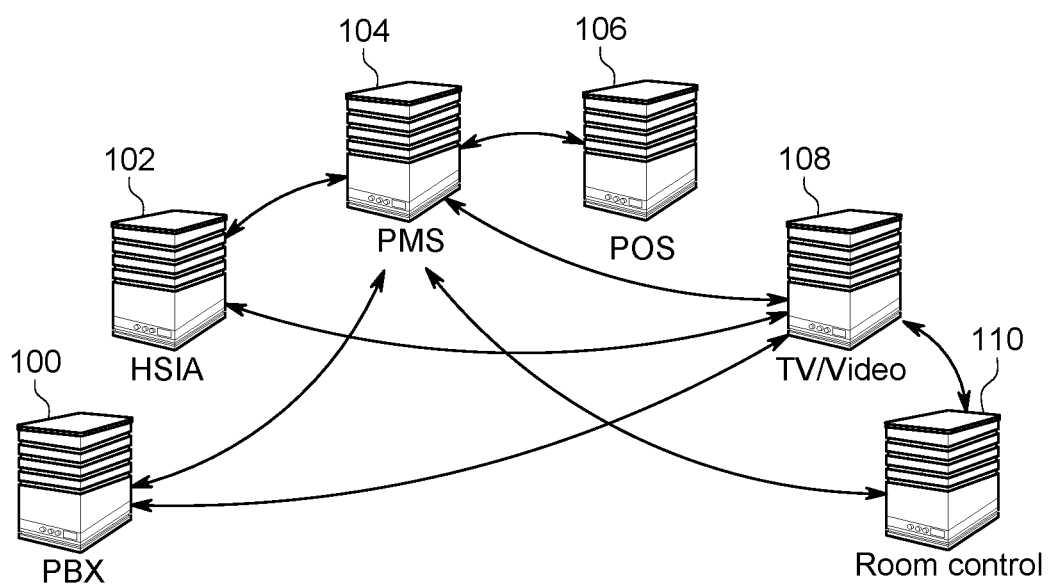
FIG. 1 shows a block diagram of the typical interconnection of different hotel systems within a hotel according to the prior art.
Figure 2:
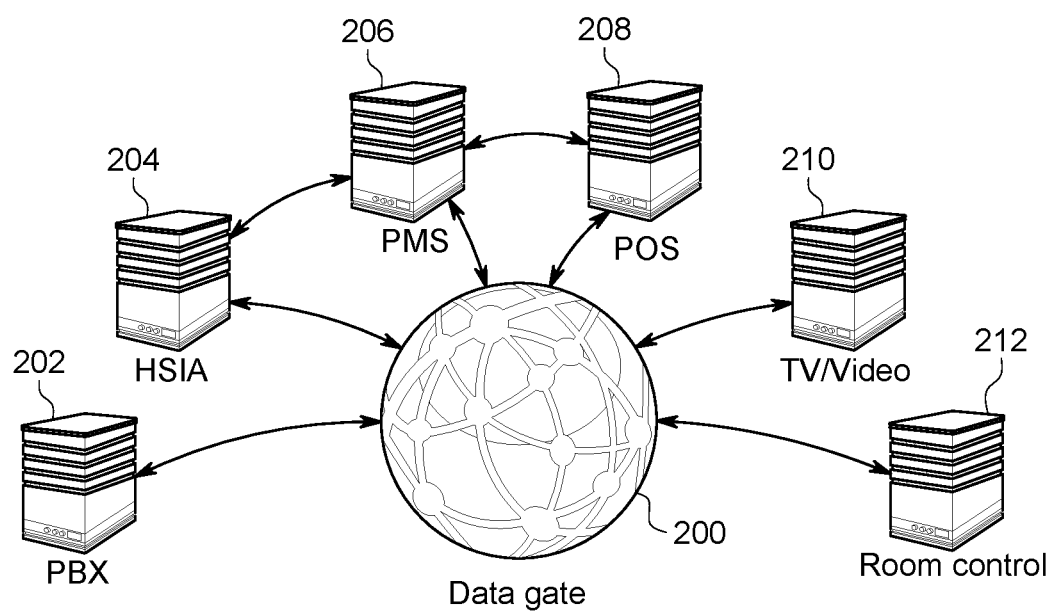
FIG. 2 shows a block diagram the interconnection of different systems interconnected by a data gate according to an exemplary embodiment of the present invention.

FIG. 2 shows a block diagram the interconnection of different systems interconnected to a data gate 200 according to an exemplary embodiment of the present invention. In the following description, it will be assumed that the interconnected system service one or more hotels, but it is to be understood that the data gate 200 may also be utilized in conjunction with any system and may service any type of establishment including hospitality establishments other than hotels. In contrast to the interconnection scheme shown in FIG. 1, in FIG. 2 each of the phone private branch exchange (PBX) system 202, Internet system 204, property management system (PMS) 206, point of sale system 208, in-room video system 210, and room control services system 212 are all coupled to a central data gate 200. The data gate 200 is a unified communication gateway through which all services and systems at the hotel talk to one another.

The data gate 200 acts as a traffic cop to make sure information gets to where it needs to go. This way, if a hotel needs to replace one of these services with a different one, the hotel does not need to wait for all the integration work to be re-done to ensure compatibility of the new system with those of the other vendors.

Figure 3:
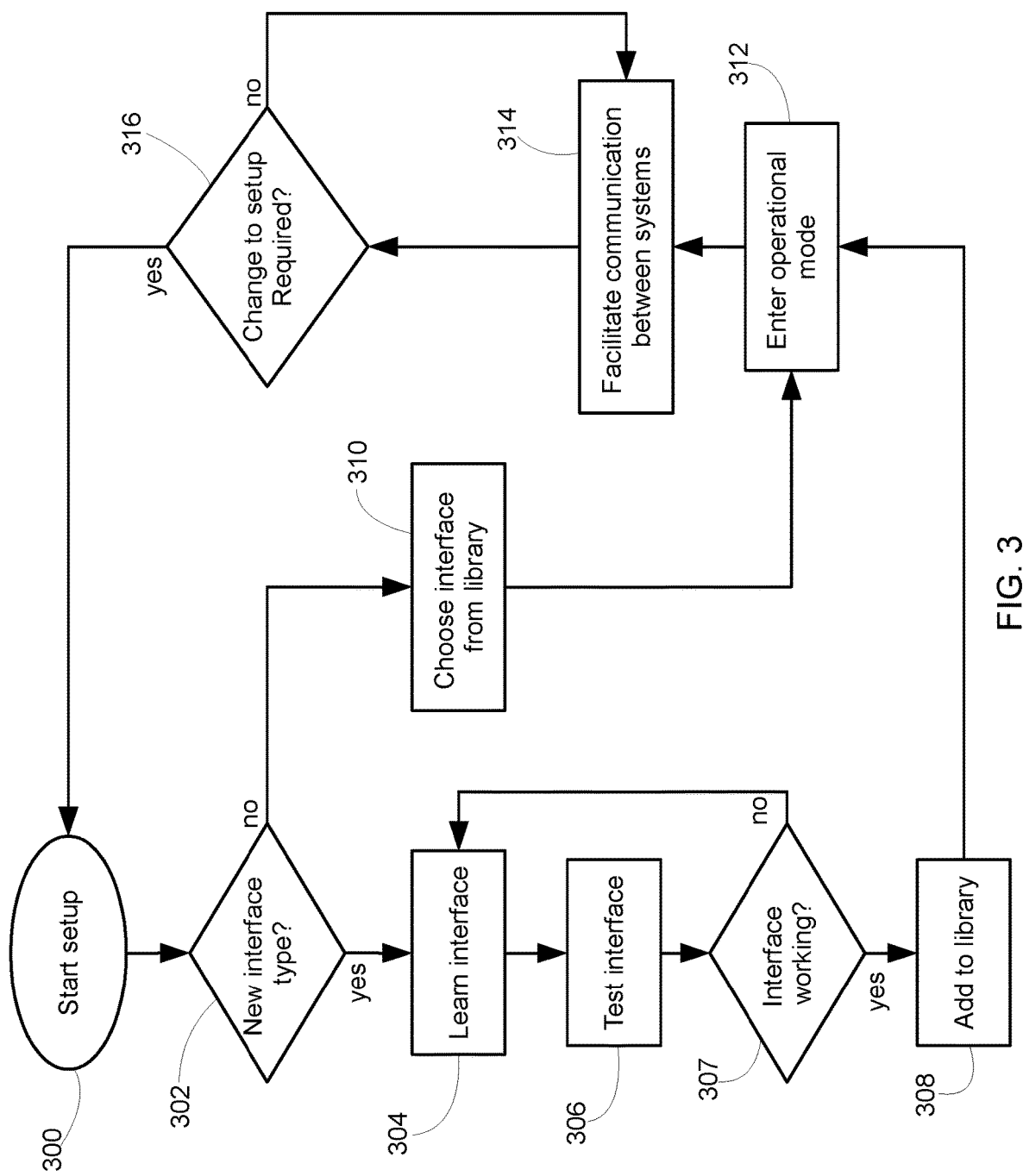
FIG. 3 shows a flowchart of a method of setting up the data gate of FIG. 2 for enabling communication with a different interface type according to an exemplary embodiment.

FIG. 3 shows a flowchart of a method of setting up the data gate 200 for enabling communication with a different interface type according to an exemplary embodiment. The steps of FIG. 3 may be performed by one or more processors of the data gate 200 executing software instructions in conjunction with optional input from an administrator or technical support staff via a user interface (UI). The steps of the flowchart are not restricted to the exact order shown, and, in other configurations, shown steps may be omitted or other intermediate steps added.

At step 300, the process begins upon starting the setup process of the data gate 200. For instance, this may represent the initial installation of the data gate 200 at a new hotel, or may represent a change of one of the existing vendor systems 202, 204, 206, 208, 210, 212 at a hotel. The UI may have a menu item to initiate an interface setup mode.

At step 302, the data gate 200 determines whether a new interface connection type is required to be learned. Each type of vendor system may have different interface requirements. The requirements may include different message protocols and/or connection types. In some embodiments, step 302 is implemented as an on-screen menu for an administrator to select whether they want to learn a new interface or to select an existing one from a library of available interface configurations. In some embodiments, step 302 is implemented as an automatic detection performed by the data gate 200 itself detecting a physical cable being plugged in such as an RS-232 or Ethernet cable, and/or detecting a type of the connected device and/or a required protocol version. The data gate 200 may automatically detect whether or not the connected system is of a known type of an unknown type. When a new interface type is required to be learned, control proceeds to step 304; otherwise, when the interface is already recognized, control proceeds to step 310.

At step 304, the data gate 200 learns the new interface type. In some embodiments, the learning process is facilitated by a graphical user interface (UI) that displays captured function data from the newly connected system and allows an administrator to highlight fields within that function data. The highlighted fields are then mapped by the administrator to specific variables recognized by the data gate 200. In some embodiments, the data gate is able to automatically recognize and reproduce the formatting around the variables in order to create new function data that is compatible (i.e., compliant) with the new interface type. Learning can also initially be started by a user entering in and setting up the interface based on a spec doc using the UI. Then the testing and changes done through the learning processes described herein can be made by the user using the UI. The spec doc may be manually entered or downloaded from an interface library. Although some embodiments require an administrator or other technical support staff to work with the graphical user interface and manually map variables to fields in the function data, there is beneficially no low-level programming involved in many embodiments so the work required by the support staff is greatly simplified. The visual user interface allows the data gate to be configured in a faster manner when a new interface type is required because a greater number of human users will have the skills necessary to operate a visual user interface versus coding a low-level interface using a standard text-based programming language.

In some embodiments, the data gate 200 learns the new user interface at step 304 utilizing machine learning in a fully automated manner that does not involve human user interaction. For instance, a hotel may have an existing interconnection system such as shown in FIG. 1 already working. The hotel may wish to switch to utilizing a data gate 200 as disclosed herein for benefits such as allowing future upgrades to be done in a more convenient manner. In order to convert a system such as illustrated in FIG. 1 to that shown in FIG. 2, the data gate 200 may first be connected to two systems that are already communicating properly with one another. The data gate 200 then acts as a transparent proxy between the two devices such that each thinks it is talking with the other, even though all traffic is in fact being passed through the data gate 200 for analysis. As the messages flow between the two connected devices, the data gate 200 identifies which parts of captured function data are changing in the messages of a same type and determines these changing portions of the data to represent fields in that function's data. For instance, a plurality of room billing messages will have parts of the data representing the room number to bill as well as the amount to bill changing between different messages. These changing portions of that particular type of function data are thereby identified as fields.

The data gate 200 may then utilize heuristic algorithms to detect which fields should be mapped to which known variables. Each variable represents a known type of information. For instance, the data gate 200 may recognize that a certain field always contains a number that matches one of the known room numbers at the hotel. This likely means the field should be mapped to a "Room number" variable. Likewise, a field that always contains a number in of the format $XX.XX may be mapped to a "dollar amount" variable. Again, the data gate 200 can also determine the other formatting requirements and build the interface code as data traffic is passed between the two systems. At a certain point, all changing fields in the data will be mapped to variables and all other formatting requirements will be known and reproducible by the data gate 200. The new interface type has been learned. The data gate 200 may thereafter create and send new messages to the two devices using the automatically learned interface type.

Any combination of machine learning and/or human assistance may be utilized at step 304 to allow the data gate 200 to learn a new interface type in the fastest and easiest manner possible. In some cases, there may not be working connections available for the data gate 200 to monitor between two systems so a human may choose to use the visual interface to manually map variables to fields. Likewise, in other cases, the data gate 200 may automatically determine which parts of the function data are changing and therefore represent fields, but the human user many still manually map the detected fields to specific variables for better accuracy. For example, the human user may be able to better recognize that a certain field is holding a room number while another field is holding a dollar amount. A human user mapping the known variables to the specific fields may be faster or more reliable than the data gate 200 machine learning this mapping in some situations. Any combination and permutation of manual and automatic learning may be employed at step 304 in different embodiments.

At step 306, the data gate 200 tests the newly learned interface. In some embodiments, the testing process involves human interaction to verify things are working properly. For instance, if the new interface is the in-room movie system 210, the data gate 200 may send a number of channel change messages, a number of TV on/off messages, etc. The human user then verifies that the appropriate channels are displayed and/or appropriate in-room TVs are turned on/off.

In some embodiments, the verification process at step 306 may be automatic where the data gate 200 receives acknowledgements back from one or more other devices to confirm that new functionality over the interface is working. For instance, the data gate 200 may generate and send an incoming phone call message to the PBX system 202, which if received by the PBX system 200 and properly formatted according to the required interface type of the PBX system 200 will cause the PBX system 202 to generate and send a new message to the TV/Video system 210 to display an onscreen phone call alert and mute the volume. This new message from the PBX system 202 will be received by the data gate 200 (since the data gate 200 is intermediate the PBX system 202 and the TV/Video system 210) and can therefore be utilized to confirm that the original incoming phone call message to the PBX system 202 was successful.

At step 307, the data gate 200 determines whether or not the new interface type is working properly based on the testing performed at step 306. For instance, when all the tests are deemed successful, either by a manual confirmation process or by the data gate 200 automatically confirming the test result, the data gate 200 marks the new interface configuration type as finished and proceeds to step 308. Alternatively, if the testing performed at step 306 was not successful, control returns to step 304 to continue learning the new interface and updating the configuration.

At step 308, the data gate 200 adds the newly configured interface to a library of interface configurations. The library may be stored in a storage device such as a hard drive or FLASH memory coupled local to the processors of the data gate, or may be stored in a cloud based storage device such as an interface library server provided by the vendor of the data gate. As new interface types are learned by the data gate over time, the library will grow. Especially when the library is stored in the cloud and accessible by data gates handling interconnections between different hotels, the frequency at which new interfaces will be encountered will decrease as the library expands over time. Basically, the library of known working interfaces will increase as the data gates 200 learn new interfaces configuration across the plurality of hotels and populate the library. Once an interface type is known and stored in the library, it can be retrieved and installed by any data gate 200 that needs to interconnect with an external system using that interface type.

At step 310, the data gate 200 downloads and installs a known interface type from the library. In some embodiments, the administrators or other support staff user can filter the existing interface types according to genres such as Video, PMS, PBX, etc. Thereafter, the various known interface types may be listed for the selected genre and perhaps labelled utilizing other specified attributes such as the manufacture name, brand, and/or model number of the particular equipment.

At step 312, the data gate 200 leaves setup mode and enters operational mode for the new interface, either a newly learned interface at step 304 or a newly chosen interface from the library at step 310. For this point on, any of the systems 202, 204, 206, 208, 210, 212 coupled to the data gate can send and receive messages to/from the new interface.

At step 314, the data gate 200 facilitates communication between the various systems 202, 204, 206, 208, 210, 212. For example, while facilitating communications, the effective operation of the data gate 200 in FIG. 2 will be to provide the various connections between the systems 202, 204, 206, 208, 210, 212 as illustrated in FIG. 1. However, unlike the connection structure of FIG. 1 that require direct connections between the various systems 202, 204, 206, 208, 210, 212, in FIG. 2, the structure simply involves each of the various systems 202, 204, 206, 208, 210, 212 being connected to the data gate 200 rather than to each other.

In some embodiments, conversion between different interface message formats/types and other implementation details of the data gate 200 are similar or the same as described in U.S. Pat. No. 9,185,178 issued Nov. 10, 2015 and entitled "INTERFACE GATEWAY AND METHOD OF INTERFACING A PROPERTY MANAGEMENT SYSTEM WITH A GUEST SERVICE DEVICE", U.S. Pat. No. 9,456,047 issued Sep. 27, 2016 entitled "INTERFACE GATEWAY AND METHOD OF INTERFACING A PROPERTY MANAGEMENT SYSTEM WITH A GUEST SERVICE DEVICE", and U.S. patent application Ser. No. 15/254,036 filed Sep. 1, 2016 and entitled "CENTRAL INTERFACE GATEWAY AND METHOD OF INTERFACING A PROPERTY MANAGEMENT SYSTEM WITH A GUEST SERVICE DEVICE VIA THE INTERNET", which are each incorporated herein by reference. As the actual conversion between known interface types of different types is already well known in the art, further description of the actual conversion process at step 314 is omitted herein for brevity.

At step 316, the data gate 200 determines whether a change to the interface setup is required. In some embodiments, a hotel or other staff member may access the visual interface of the data gate 200 to specify that they are adding a new system or changing an existing system coupled to the data gate 200. Adding a new system or changing an existing system to a different vendor may require the data gate 200 to be updated to use a new interface type compatible with the new/changed system. Likewise, rather than a manual process, the data gate 200 may itself determine when a change is required by automatically detecting the connection of a new system, removal of an old one, or by detecting errors or unrecognized network traffic or messages from one of the systems. Upon a change being required, control returns to step 300 to restart the setup process.

Figure 4:
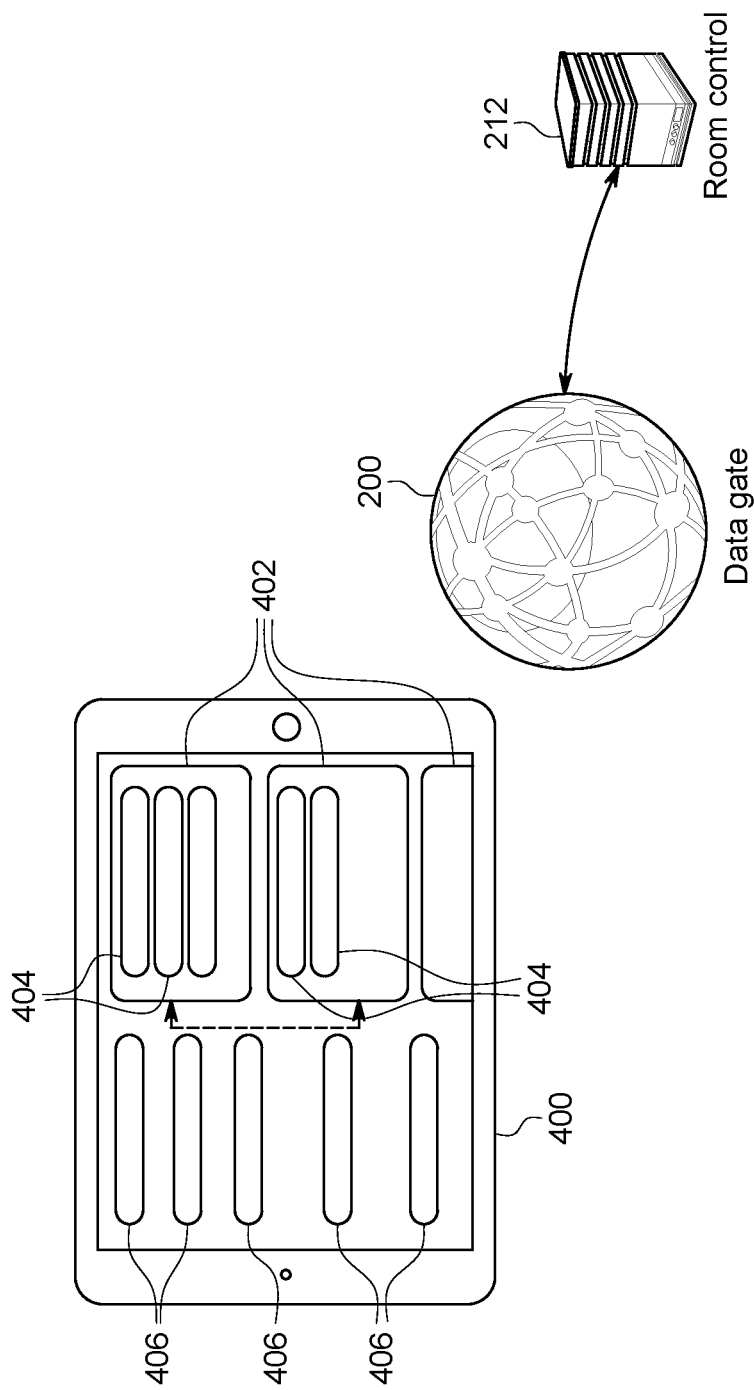
FIG. 4 shows an example of the visual user interface that may be displayed by the data gate at the "Learn interface" step of FIG. 3.

FIG. 4 shows an example of the visual user interface 400 that may be displayed by the data gate 200 at step 304 of FIG. 3. In this example, the hotel is replacing the room controls service 212. After the old room controls service 212 is replaced with the new one, the connection from the new room services system 212 to the rest of the services is broken. This is a key piece of why it is so costly and frustrating to complete an integration. Every system speaks a different language. One of the features of the data gate 200 in some embodiments is to simplify the integration effort and most importantly remove or even eliminate the need for human users to perform any software development coding as much as possible. In some embodiments, a simple to use visual user interface 400 is provided where a user can analyze the communication pathway between a new system coupled to the data gate 200 and then simply drag and drop fields and variables to create a new interface type configuration for the new system. The interface learning and setup may be done local at the hotel or the visual user interface 400 may be accessed remotely over a computer network in different embodiments.

The user interface 400 includes a number of data functions 402 on the left hand side. The data functions 402 represent messages of particular types captured by the data gateway on the new interface. Taking the room control service 212 as an example, different functions may include messages sent and/or received in order to: set temperature, open blinds, close blinds, turn on fan, turn off fan, turn on/off desk lamp 1, turn on/off desk lamp 2, turn on/off overhead lights, etc. Other types of messages may be represented as different data functions, for instance, for a PMS system data functions may include: post a charge, guest check-in, guest check-out, get guest details, etc. Each of these data functions 402 may have any number of fields 404 within them such as a function code, a room number, a target device identifier etc. A setup technician may put the data gate 200 into learning mode (step 304) and then utilize a handheld or other configuration apparatus to send a plurality of proper data functions 402 (i.e., messages, commands, etc.) via the data gate 200 to the new room control system 212. The configuration device may be an iPad or any other portable electronic device coupled to the data gate 200 to generate or query the newly connected system.

In some embodiments, a handheld configuration apparatus such as that disclosed in U.S. Pat. No. 8,250,601 issued Aug. 21, 2012 entitled "CONFIGURATION APPARATUS AND METHOD OF CONFIGURING ONE OR MORE DEVICES HAVING HIDDEN CONFIGURATION SETTINGS", U.S. Pat. No. 9,106,796 issued Aug. 11, 2015 entitled "CONFIGURATION APPARATUS AND METHOD OF CONFIGURING ONE OR MORE DEVICES HAVING HIDDEN CONFIGURATION SETTINGS", and US Patent Application Publication No. 20150350017 published Dec. 3, 2015 entitled, "AUTOMATED ENTRY OF HIDDEN SERVICE-CONFIGURATION MENU FOR TARGET CONFIGURABLE DEVICE SELECTED FROM PLURALITY OF CONFIGURABLE DEVICES IN ROOMS OF HOSPITALITY ESTABLISHMENT" may be utilized. Each of these patents and application are incorporated herein by reference.

Any number of specialized scripts may be run on the configuration device to send enough data functions 402 to/from the new room control system 212 (or other new vendor system) such that the data gate 200 can observe enough data to display the data functions 402 and identified fields 404 on the user interface 400.

The data gate 200 may also have the configuration and message generation functionality built in such that no separate configuration device is required.

The visual user interface 400 may be display on the configuration device or any other display device coupled to the data gate 200. By using touch technology devices such as an iPad, an interface between services could be analyzed by data gate 200 and then presented in a graphical view 400 for set up. The user simply drags the different data variables 406 understood by the data gate 200 into the available fields 404 of the different functional boxes 402 to define the interface specification. Of course, touch screens are not a requirement and any suitable type of user interface may be utilized such as dragging and dropping with a computer mouse, for example. After mapping variables 406 to fields 404, the data gate 200 then does all the heavy lifting in the background to encapsulate the data with the extra interface encoding needed. Extra interface encoding may include the fixed formatting requirements of a particular data function 402 such as where to place commas between fields in an array or whether to use square brackets or parentheses, etc. For example, the data gate 200 may recognize common fixed formatting types such as JSON v. XML and populate the data functions with the required fixed formatting according to the automatically recognized types. A manual fixed formatting type dialog box or selection may also be made by the user to speed this process.

Once that is all done, at step 312 the link is re-established between, in this instance, the new room control services 212 and the data gate 200, and the rest of the services 202, 204, 206, 208, 210 will again have the functionality of the room services 212 available for them to communicate with.

For instance, the video system 210 is again able to open and close the blinds based on the guest's use of the remote control and the PMS system 206 is able to set an economical temperature for the room when it is vacated. This is particularly beneficial because no changes were required to be made to the video system 210 or the PMS system 206 in this embodiment. Instead, the data gate 200 simply learned and activated the interface type of the new room control service system 212.

What's more, by having a data gate 200 for all interface traffic to pass through, the hotel and plurality of vendors have ready access to the data for auditing purposes. Data audits can put a stop to the finger pointing between vendors. No more of vendors stating, "our system sent the data, it must be the other guy." Data gate 200 storing a log of sent/received messages in a storage device can prove who (i.e., what system) sent what data and when. Troubleshooting times may be drastically reduced and a plan for resolution can be presented much sooner now that the politics have been taken out of the situation.

Figure 5:
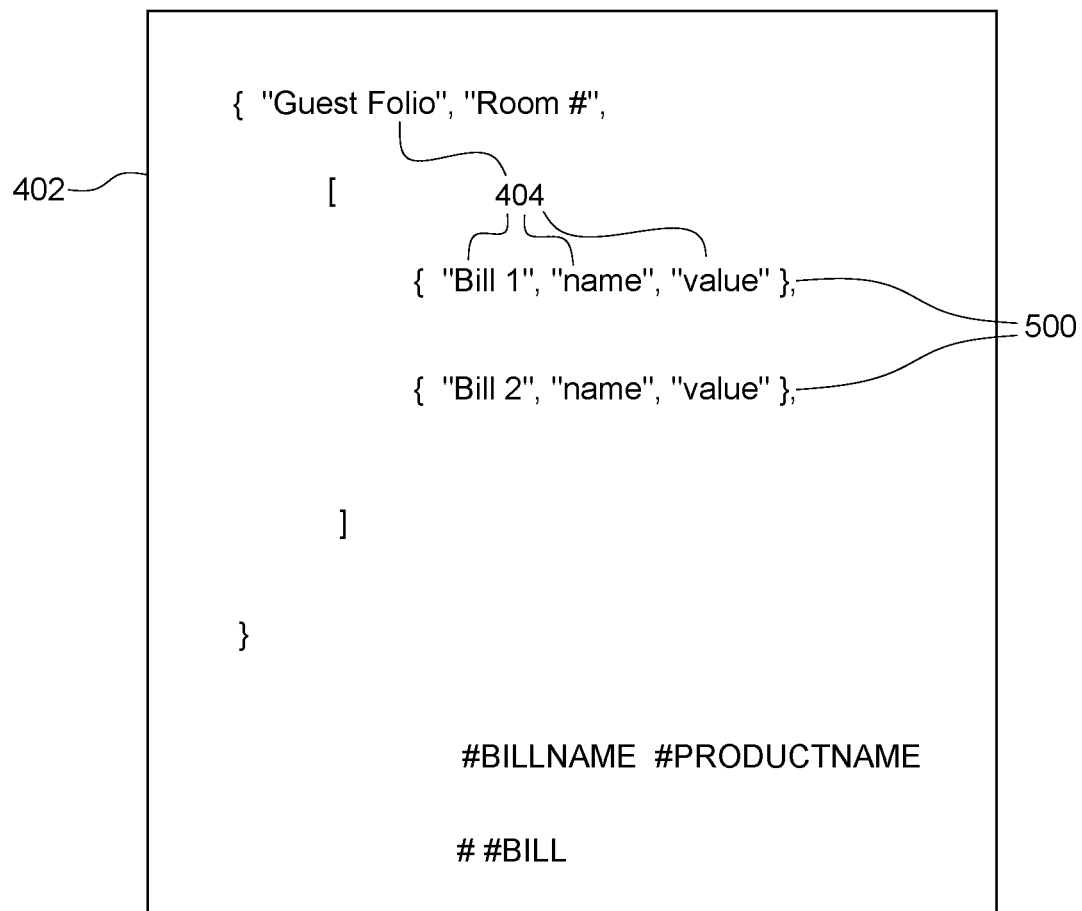
FIG. 5 illustrates an example of a PMS function called "Guest folio", which is the data function response to a "Get folio" data function message sent to the PMS of FIG. 2.

FIG. 5 illustrates an example of a PMS function called "Guest folio", which is the data function response to a "Get folio" data function message sent to the PMS 206. During the learning mode at step 304, the visual user interface 400 will highlight the various fields 404 within the function data 402. Of course, a user may indicate these fields 404 by highlighting them during inspection of capture data functions 402. However, these fields 404 may instead be automatically detected by the data gate 200 in some embodiments by the data gate 200 noticing that the curly and square brackets, quotations, and commas stay the same for each "Guest folio" message, but the highlighted data changes and therefore should represent fields 404.

Once the position of the fields 404 in the data function 402 are identified (either manually or automatically), either the user or the data gate 200 itself may then drag and drop PMS-related variable 406 names such as "Bill name", "Guest name", "Amount" onto the matching fields 404. Once a particular variable 406 is dropped on a particular field 404, the two are mapped together and the data gate 200 will be able to understand incoming messages with that field or outgoing messages with that field 404 depending on whether the data function message is incoming or outgoing. Again, mapping variables 406 to fields 404 may be a manual operation or an automatic operation. Both modes may be supported by a single data gate 200 and whether or not to use manual or automatic mapping may be a user configurable option or setting.

The visual user interface 400 may also allow the user to indicate other structures in the data functions 402 (and/or the data gate 200 itself may automatically perform this as part of the machine learning). For example, as shown in FIG. 5, the data function 402 includes a plurality of two bills records 500. Each of these records 500 includes the same fields 404. By identifying arrays such as the bill records 500, the data gate 200 can be easily configured to recognize and create multiple bill records in a single message. For instance, the user may highlight the first bill record 500 and then right click or other access an attributes section. Within the attributes section, the user is able to specify whether that field can repeat and if yes how many times (if there is a limit). In this case, each bill record 500 is an array that contains a plurality of fields 404.

The system architecture of FIG. 2 is not intended to limit whether particular devices are local at the hotel or provisioned in the cloud. For instance, in different embodiments, any of the various components of FIG. 4 may be located on premise at the hotel or may be cloud-based and accessed over the Internet. For instance, the data gate 200 can manage critical business data between systems on property. Likewise, as services move up to the cloud such as PBXs and even property management systems, the data gate 200 can also be connected with and manage intercommunications between these cloud-based services. Likewise, the data gate 200 may itself be moved into the cloud and may interconnect systems that are either cloud-based and/or on premise at specific hotels. Any combination of cloud/local positioning may be used for each of the data gate 200 and the various services connected to one another via the data gate 200.

Figure 6:
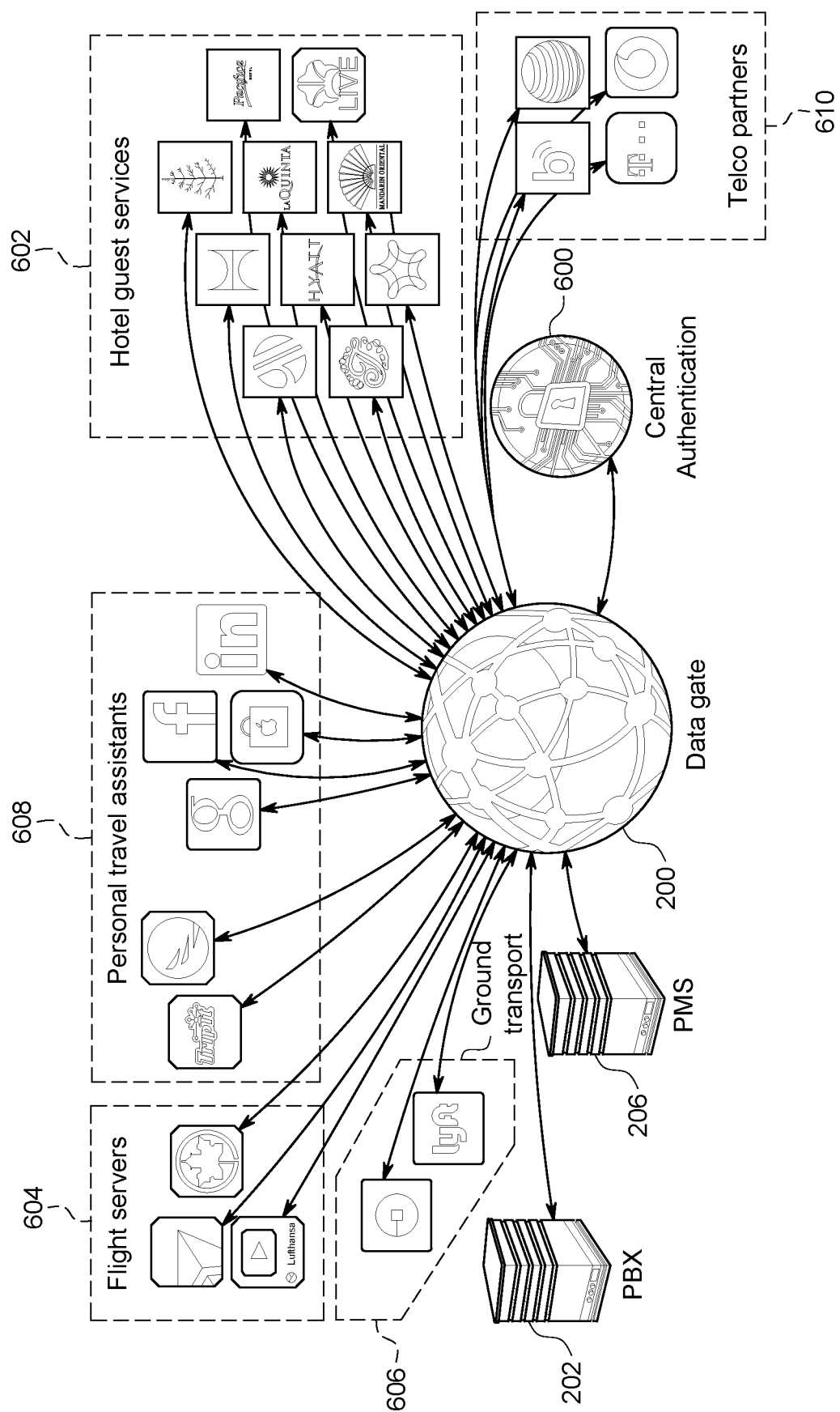
FIG. 6 illustrates a block diagram of a data gate of FIG. 2 located at a hotel property communicating with a cloud PBX and cloud PMS ensuring connectivity between the two.

FIG. 6 illustrates a block diagram of a data gate 200 located at a hotel property communicating with a cloud PBX 202 and cloud PMS 206 ensuring connectivity between the two. Data flow between cloud and on property systems happens within data gate 200. All systems are able to talk to each other regardless of their location as if they were directly connected to each other. For example, the video system 210 is still able to post movie charges to the PMS 206. As far as it knows, the PMS 206 is still on property.

As illustrated in FIG. 6, the data gate 200 may also be connected to a central authentication system 600 and enable the ability to authenticate guests automatically as they go from property to property based on their loyalty status or perhaps by agreements with third parties such as telco partners 610 etc. for revenue sharing.

After a central authentication system 600 is connected to the data gate 200, additional functionality is enabled. For example, now the data gate 200 can pass data from central authentication 600 to the other services a property has in place. One obvious path is to the HSIA system 204, but other systems such as the video and room control systems 210, 212 can also beneficially make use of data stored at the central authentication system 600. For instance, with this connection in place, these systems 210, 212 may query any hotel databases stored at central authentication for guest preferences such as a particular guest's language or favourite TV channels allowing the video system 210 to change the language of the user interface automatically or to reorder its program guide. Likewise, the room control system 212 can automatically set a preferred room temperature for when the guest arrives.

In some embodiments, central authentication handles all the rules for authentication while the data gate 200 manages the actual flow of data. That way, if a hotel needs to add on another source or service there is little need for any additional development. Adding in another source of data is as easy as it was to add in a service at the property level. In some embodiments, all connections flow straight through data gate 200, which unburdens various devices like the central authentication 600 from having to handle other queries unrelated to authenticating the user. With the data gate 200 acting as the universal interface gateway, the flow of data is much more efficient and easier to maintain. In this way, hotel-specific guest databases 602 may be stored in the cloud on servers independent from the central authentication system 600.

One of the top concerns of hotel management is ownership of the guest and guest loyalty. It is a struggle for hotels to capture the guest at the beginning of their trip planning. Online travel agent (OTA) sites such as Expedia, Kayak, Booking and Hotels.com are cannibalizing the hotel's connection with their guests and more importantly, their loyalty members. Less and less people are going to hotel web sites to book a stay. Instead they go to the OTA aggregators to do this.

However, these OTAs suffer from the same issues as hotel sites. The OTAs lose the guest after the booking. For that there are a couple services of referred to herein generally as travel or personal assistant sites such as WorldMate and TripIt. These are sites that take the guest from their home to a hotel. Users can find it invaluable to keep all travel information in one place. When it is time to travel, the user can simply open the app and see what time their flight leaves, what airline it is, what hotel their staying at and have all the confirmation numbers in one place should they need them during check in.

Bigger players such as Facebook, Linked In, Google, and Apple are just now recognizing the value of these travel assistant type services. These larger players have the resources and products to take this service to the next level. For instance, Google owns a vast amount of information and from it they have had services such as Google Flights for some time. It's very easy to look up flights in an easy to use, aggregated view. Now they have recently launched Google Trips this past September. Google Trips is very similar to Worldmate or TripIt in that it has all user travel information in one location. It also includes useful information about where the user is traveling to by leveraging the vast amount of information they have stored in their databases from their search engine. Furthermore, unlike Worldmate or TripIt, a user does not need to send the information to Google trips. Instead, as long as the user has a Gmail account, Google Trips automatically gathers the travel information directly from reservation confirmation messages received in the Gmail account and automatically builds up the itinerary for the user.

In this manner, Google now has the ability to interact with a hotel guest even before the guest leaves their own home. Google has all the guest's information and can lead them through all the way to the hotel. Because they have ownership of the operating system on the mobile device they could also tightly integrate this functionality right into the OS itself. So the location of the guest could be used to automatically show the guest's boarding pass on the phone's lock screen if at the airport or show the hotel confirmation number on the phone's lock screen if at the hotel. Similar to what Apple does today with their wallet. All without requiring the user to dig into their phone to find the right app or email or worse yet, a stack of papers, to find what they need.

Beneficially, these services are integrated with data gate 200 to provide even better functionality and user experience according to some embodiments. Data gate 200 allows a hotel to continue the personalized experience for the guest all the way from their home, to the airport, to the property, and inside the property for their entire stay, and then all the way back to their home again.

For instance, by connecting data gate 200 to the airline flight data servers 604, the system of FIG. 6 allows the hotels to connect up flight information with specific guests and get up to date information about any delays on arrivals. This way the hotel can know if a guest's flight has been delayed or cancelled. This gives the hotel better knowledge on whether to give up the guest's room for the night or whether the room should be held.

Data gate 200 can also be connected up with popular ride sharing and other transportation systems 606 such as taxis, ground transport, etc. From the flight information 604, the hotel knew when the guest was in the city, but with the connection to the ground transport systems 606 such as Uber etc., the hotel now can get to the minute updates on when that guest will arrive at the hotel.

Connecting the data gate 200 to a plurality of systems as shown in FIG. 6 is useful for a number of reasons. To illustrate advantages in some embodiments, the following provides a use case scenario from the perspective of the guest.

A future guest to a hotel first needs to book their travel plans with the airlines and a hotel. They do this by either using the hotel/airline websites and/or app or, as in increasingly likely, an OTA. Once this is done they receive their itinerary. However, now these sites lose connection with the guest. The Travel Assistants take over. The guest either sends their information or this process is automatic to the Travel Assistant. Now a site like Google Trips has the travel information for a future guest of the hotel. The Travel Assistant takes that guest to the airport via a cab. Then on to their flight and then even helps them with arranging their transportation to the hotel at the destination.

As shown in FIG. 6, by integrating data gate 200 with Google and other personal assistants 608, the hotel now also knows the guest's travel itinerary. The hotel knows when the guest is on their way to the hotel and more importantly, when they will arrive. Because the data gate 200 is integrated with these services 604, 606, 608 in the cloud, the hotel now knows when that guest is due to arrive. From any delays in their flights to getting up to the minute updates on when exactly that guest will arrive via local ground transport.

Because data gate 200 is also integrated with the hotel's PMS 206, the PMS 206 can automatically notify staff about when this guest is arriving. With the hotel's guest loyalty systems 602 integrated with data gate 200 the hotel will know if this is a premier loyalty member. Now the PMS 206 can notify the front door staff at the hotel so that they can greet that guest, by name, as they open the door to the cab and help the guest into the hotel. "Mr. Levy, welcome!" Starting a very personalized service offering. For VIP guests, the hotel system may issue an alert or other message to the mobile phone or portable device of a door staff at the hotel front door with the license plate or other description of the vehicle that will be bringing the guest to the hotel. Optical scanners may be installed at the hotel driveway and detect the vehicle upon arrival to the hotel property and update the notifications to hotel staff.

Another scenario is once the hotel knows that the guest has landed, the hotel guest services system 602 can send the guest a notification to allow them to remotely check into the hotel. A digital key could be sent to their phone and the guest can proceed right into the hotel and to their room avoiding any frustrating lines at the front lobby. The guest may also interact with the hotel and even their assigned guest room before they arrive at the hotel. For instance, the guest may send one or more commands to set up the video system 210 to record a sporting event so they can watch it when they arrive. Or perhaps order a larger channel package so it's ready when they arrive. If all guests of the hotel by default get access to ten channels, a guest en route to the hotel may send a command from the hotel app on their phone or via a reservation preference etc. to upgrade their room to get the all sports channel package.

Now in the hotel and within the hotel's sphere of influence to offer services to the guest, the data gate 200 can make the personalized experience even better. Of course, now that the guest is in the hotel all, their devices automatically authenticate onto the hotel network with central authentication 600. Further, the video system 210 in the room can also adapt to the guest's preferences because that system 210 can get the needed information from the hotel's loyalty system 602 through data gate 200. The video system 210 sets their preferred language and reorders the channels and content available on the interactive program guide (IPG) to the guest's preferred line-up and orderings. The room control 212 likewise retrieves the guest's preferences from the hotel guest loyalty system 602 and sets the temperature of the room to the guest's liking before they even get to the hotel. The room control system 212 automatically initiates the temperature change in response to ground transport messages and/or flight arrival messages received from the ground and flight systems 606, 604 such that the room has enough time to cool off (or heat up) before the guest arrives. However, because the temperature change is initiated on actual arrival time of the guest, energy usage is conserved at the hotel by avoiding setting the temperature too early in advance.

There is also integration with room service and other amenities within the hotel property. These can be done either through the TV, phone, or hotel mobile app based on information received via the data gate 200. At the end of their stay, a bellhop can be requested who can help with the guest's bags. All while a cab has already been called waiting for their departure. All of this can be accessible through the hotel's own branded app making the app the one place the guest goes to do anything they need to get done at the hotel.

With all of these services integrated and the flow of data being handled by the data gate 200 the above use case scenario is possible. The different services do not need to know about all other services connected to the data gate 200. They are just looking for the specific data and request it from the data gate 200. The data gate 200 handles the process from there and ensures the correct data is translated and flows to where it is needed. Without a system like the data gate 200, to still achieve the above use case scenario would require a mess of interconnections similar to as shown in FIG. 1 but with even more independent connections between even more service systems. Every service system and the related connections therefrom represent an interface type that could change, and any change at one system would require changes to be made at all the other interconnected services connected thereto for continued compatibility. Imagine doing this on the scale that is shown in FIG. 6 and one can truly see the advantage of the data gate 200 architecture and easy interface configuration process disclosed herein.

Of course, other variations are also possible. For instance, a hotel may not like the nagging issue that they do not truly get access to their guest until after the guest arrives at the property. Having a personal travel assistant system 608 separate from the hotel's guest services 602 essentially results in two distinct app's the guest needs to use. Ultimately, they and the hotels may not want this. With a system like data gate 200 illustrated in FIG. 6, the hotel is given the opportunity to take control of it all.

Figure 7:
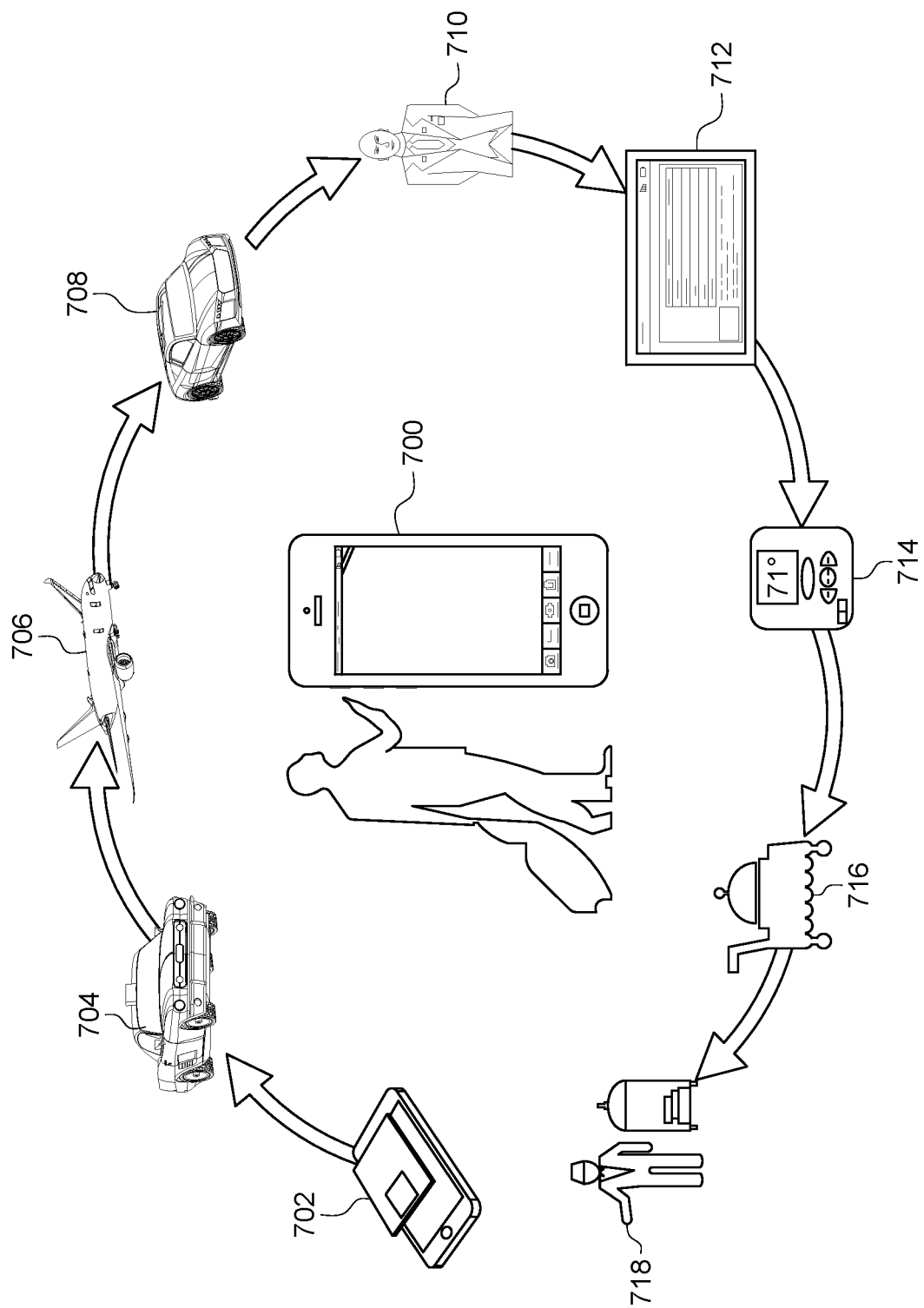
FIG. 7 shows a trip flow where all data needed by the guest during their trip is integrated with a single app funning on the user's mobile phone via the data gate of FIG. 6.

FIG. 7 shows a trip flow where all data needed by the guest during their trip is integrated with a single app running on the user's mobile phone 700 via data gate 200. Because the property is integrated with the data gate 200, the hotel can take this to the ultimate step shown in FIG. 7. Instead of losing the guest after they have done their bookings and the external travel assistants 608 take over, why not retain the guest and keep that data within the hotel app? The hotel app can be integrated with data gate 602 as well. Request and send what the app needs on behalf of the loyalty guest. For instance, instead of sending their itineraries to one of the external travel assistants 608, have the itineraries and other bookings sent to the hotel's loyalty branded app instead.

In this way, a hotel will have truly taken back their guest and given them a service they will use from the beginning. They will want to be a loyalty guest even more to gain this functionality. One place to get all their information and the same app to do everything they need in the hotel.

All of this is possible if the data is available and integrated. At its core, the data gate 200 is an integration platform with easy interface learning capabilities. Allowing multiple data sources and systems to talk to each other without having to re-invent the wheel each time. With a system like the data gate 200 in place, a hotel or other establishment or vendor can regain ownership of their guests. The establishment will own the interaction with the guest all the way from booking 702, to their travel 704, 706, 708, to their stay at the establishment 710, 712, 714, 716, 718, and getting them home again. For the entire journey, the hospitality establishment will have greater potential to retain and create new loyal guests.

Figure 8:
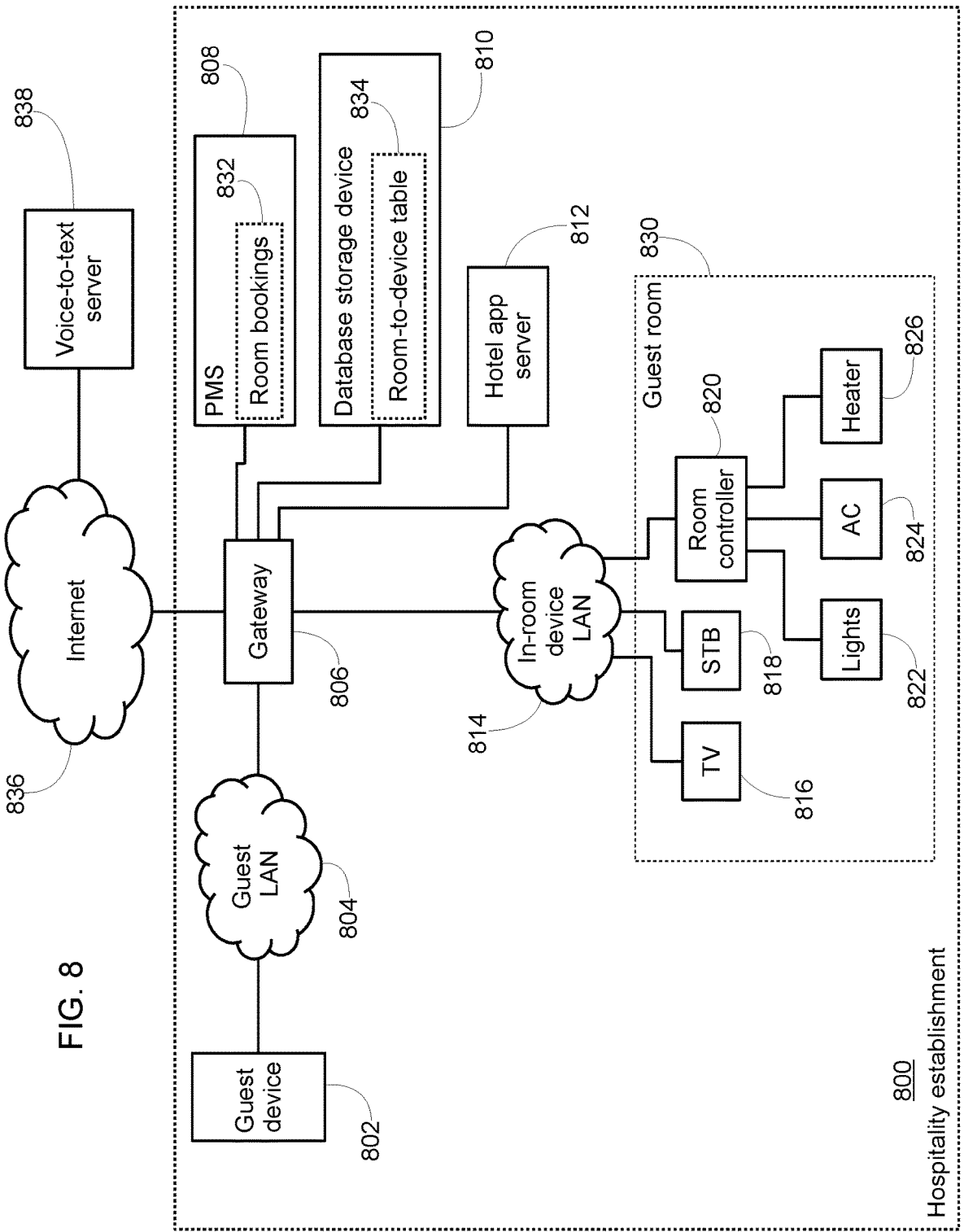
FIG. 8 shows a block diagram of a system for allowing a guest of a hospitality establishment to utilize their voice to control one aspects of a guest room according to an exemplary embodiment.

FIG. 8 shows a block diagram of a system for allowing a guest of a hospitality establishment 800 to utilize their voice to control one aspects of a guest room 830 according to an exemplary embodiment. In the following description, it will be assumed that the hospitality establishment 800 is a hotel, but it is to be understood that the same system may also be utilized at other types of hospitality establishments other than hotels.

As illustrated, the system includes a guest device 802 such as a mobile phone or laptop computer coupled to a guest local area network (LAN) 804. The guest device 802 may be brought to the hotel 800 by the user. The guest LAN 804 is coupled to a gateway 806, and the gateway 806 provides access control between a property management system (PMS) 808, a database storage device 810, a hotel app server 812, an in-room device LAN 814, and the Internet 836. The PMS 808 stores, among other data, room bookings 832 that specify which guest is assigned to which room in the hotel. The database storage device 810 stores, among other data, a room-to-device table 834 that specifies the network addresses and other information about a plurality of in-room devices 816, 818, 820, 822, 824, 826 located in each of the guest rooms 830. For instance, in this example, a particular guest room 830 is shown to include a TV 816, a set-top box (STB) 818, a room controller 820, one or more controllable lights 822, an air conditioner 824, and a heater 826. Different in-room devices may be included in different guest rooms 830 and it is assumed that the hotel has a plurality of separate guest rooms 830 even though only a single guest room 830 is illustrated in FIG. 8 for simplification of description. A voice-to-text server 838 is located external to the hotel 800 and coupled to the Internet 836 in this configuration.

Whenever possible, guests would likely prefer to use their own electronic device such as portable guest device 802 brought to the hotel 800 rather than one provided or otherwise loaned to them by the hotel 800. Especially when utilizing devices 802 that have built in recording features that could potentially eavesdrop, a typical guest would likely prefer to utilize a device 802 they own and can trust. A recording device 802 that is not personal to the user might get confused when trying to listen and decode speech from a plurality of different guests with different accents and voice sounds. A guest device 802 owned by a user will have much better familiarity with the user's voice and therefore have better reliability and accuracy at understanding the user's speech.

In view of these preferences, one embodiment of voice control involves allowing the guest to speak to their own device 802 to control the in-room systems 816, 818, 820, 822, 824, 826. In some embodiments, the voice control system can leverage the release of iOS 10 and SiriKit for the iPhone™ and similar implementations coming out from both Google on Android™ and Microsoft with Cortana™ on Window's phones. A typical guest will be completely comfortable having their own device 802 in their hotel room 830. Likewise, talking to their own device 802 is a feature that many users already do daily. It is for this reason that the individual's own device 802 knows how the user speaks. The more a particular user talks with their device 802, the more the device 802 and associated voice-to-text services 838 learn that individual user's speech sound and patterns. The user's own device 802 is much better at providing accurate voice recognition than any non-calibrated system that is bound to give the user all kinds of grief.

In this embodiment, the system leverages existing pairing technology that hotels have today that allows a guest to pair their device 802 to their hotel room 830. For instance, the pairing can be done as soon as the guest device 802 authenticates with the HSIA system 204 in order to gain access to the Internet 836. The authentication process may involve room detection and/or PMS 808 authentication and/or central authentication 600.

More details of user authentication and pairing examples according to different embodiments are provided in the following patent documents: U.S. Pat. No. 9,137,281 issued Sep. 15, 2015 and entitled "DYNAMICALLY ENABLING GUEST DEVICE SUPPORTING NETWORK-BASED MEDIA SHARING PROTOCOL TO SHARE MEDIA CONTENT OVER LOCAL AREA COMPUTER NETWORK OF LODGING ESTABLISHMENT WITH SUBSET OF IN-ROOM MEDIA DEVICES CONNECTED THERETO", U.S. Pat. No. 9,060,197 issued Jun. 16, 2015 and entitled "HOSPITALITY MEDIA SYSTEM OPERATED BY MOBILE DEVICE", U.S. Pat. No. 9,369,748 issued Jun. 14, 2016 and entitled "INTEGRATING CONTENT ON REMOTE DEVICE ACCESSIBLE VIA INTERNET WITH HOSPITALITY MEDIA SYSTEM", U.S. Pat. No. 8,732,753 issued May 20, 2014 and entitled "METHOD OF OPERATING ONE OR MORE CONTROLLABLE DEVICES IN DEPENDENCE UPON COMMANDS RECEIVED FROM A PLURALITY OF MOBILE DEVICES AND SYSTEM CONTROLLER THEREOF", U.S. Pat. No. 9,462,000 issued Oct. 4, 2016 and entitled "OFF-SITE USER ACCESS CONTROL", US Published Patent Application No. 20150373123 published Dec. 24, 2015 and entitled "CODELESS DEVICE PAIRING BETWEEN MOBILE DEVICE AND PARTICULAR ONE OF A PLURALITY OF MEDIA DEVICES", and U.S. Pat. No. 9,009,259 issued Apr. 14, 2015 and entitled "AUTOMATIC CLIENT DEVICE LOCATION DETECTION WITHIN HOSPITALITY ESTABLISHMENT". Each of these patent and application documents are incorporated herein by reference. As user authentication and pairing (i.e., associating) the user's device 802 to a particular room 830 are already well-known in the art, further description of the authentication and pairing process is omitted herein for brevity.

After the guest device 802 is authenticated and paired with a room 830, the guest-device-to-room table 835 will be updated to store a mapping of which room 830 is associated with the guest device 802. The user of the guest device 802 can then use Siri on their Apple device (or another voice command system such as Cortana on Microsoft, Alexa on Amazon, Google Assistant on Google, etc.) to turn on the lights 822 or operate any of the other in-room controllable devices 816, 818, 820, 822, 824, 826 of their assigned guest room 830.

Taking Apple's Siri as an example, the user may simply by holding down the home button and say a command such as "turn on the lights". The system of FIG. 8 then allows that phrase to be tied to the hotel room 830 and the user may interact with the technology in the room 830. In some applications, the guest may leave their phone on the bed or a table somewhere and can use the "Hey Siri" function on their Apple guest device 802. In this way, the user does not even have to press or hold anything on the guest device 802.

This is beneficial for example if the guest is lying in bed and their phone is plugged into the wall charging while being placed on a table. The guest may be feeling sleepy and be ready to shut down everything in the room 830 for the night. Instead of having to roll over and turn off everything with a remote or even grab their phone 802, the guest may simple say, "Hey Siri, good night." The system of FIG. 8 takes this command, associates it with the guest's room 830, and shuts down the various in-room devices such as a lamp 822 and TV 816 and/or any other in-room devices 816, 818, 820, 822, 824, 826.

The command "good night" in the above example corresponds to a shutdown script processed by the hotel app server 812 and may be more complicated than simply shutting off all the in-room devices 816, 818, 820, 822, 824, 826. For instance, a particular user may prefer to only dim a certain light 822 in order to have a night light. Another user may prefer to have background music playing on TV 816 at night for a certain time period (or even all night). Likewise, temperature using AC 824 and/or heater 826 may be set to preferred setting for sleeping. The system may have any number of voice commands that act as macros or scripts to perform a number of functions in the room in response to receiving a voice command. Variables in the commands may be adjusted on a user specific basis such as to set a particular user's preferred temperature etc.

In some embodiments, the voice control system enables a full "No-Touch" room where the user can control everything in the guest room 830 without needing to touch anything in the room 830. The ability to arrive into the hotel room 830 and simply say, "Hey Siri, turn on the lights." Now the user is in the room 830 and can see what they are doing with the lights on. The next thing a typical user wants to do is turn the TV 816 on. This can be done by the user saying, "Hey Siri, Turn on the TV." If the user finds it a bit warm in the room 830, the user may cool it off by saying, "Hey Siri, set the temperature to 70°." Now that the room is set up the way the user likes it, the user may get even more sophisticated in voice commands. This is where tight integration with the technology on the property really starts to shine. For instance, the user may check the news by saying, "Hey Siri, put CNN on the TV." In another example, the user may watch their favourite TV show. The user may not themselves know what channel its on and honestly, the user may not want to go searching through a program guide. No problem, the technology will do the work for the user. The user just needs to say, "Hey Siri, put Game of Thrones on the TV." The hotel app server 812 checks the interactive program guide (IPG) for the user's room's TV 816 and changes to the appropriate channel that is currently playing "Game of Thrones."

Especially for international customers, a benefit of the system of FIG. 8 is that the guest may watch desired programming such as sports events without knowing the local channel line up. When a guest is in a foreign land, the guest typically has no idea what channels are used for the sports channels. Just like before, the guest can let the system of FIG. 8 find the channel itself given a suitable voice command from the user. With technology like Siri and other voice assistants, the system can determine what the user means when they say their favourite sports team or other phrases that might be more confusing or ambiguous if it were received from another user. For instance, working with a tightly integrated system in the hotel 800, a user from the city of Calgary, Alberta, Canada may be able to simply say, "put the flames game on." This would be translated to the Calgary Flames hockey team as the target programming because the guest device 802 and/or the voice-to-text server 838 and/or the hotel app servers 812 already knows this user's location and preferences including local sports teams.

The gateway 806 may be integrated with or a part of the data gate 200 described earlier in this document for even better functionality. This allows any desired interactions between different systems such as allowing the guest device 802 to interact with any connected system of FIG. 6 for example without needing to reprogram the various interfaces of a first system if one of the other vendors changes its interface type or format. For instance, the hotel app server 812 may also be coupled to the data gate 200 thereby allowing the user to user voice commands to retrieve information and otherwise interact with any of the serves coupled to the data gate 200. Not only would the system of FIG. 8 find a TV channel that has hockey on it but it would find the right game with the Calgary Flames team knowing who the user is and what their preference is even as the user travels all around the word. This may even include sending video on demand from a video on demand (VOD) server 210 coupled to the data gate 200 thereby allowing the user to watch the "flames game" (or any desired content) at a hotel anywhere in the world even if the hotel would not otherwise provide that content to other guests.

These are just a few of the examples of what this technology can do in the guest room 830. No longer do people have to fiddle with remote controls or foreign input devices. They no longer need to scan or search through countless channels to find what they want. Adding voice control that they are familiar with drastically streamlines all these activities. A guest may be up and running in their room 830 within seconds.

At the end of the night, the guest just needs to say, "Hey Siri, Good night." The TV 816 shuts off, the thermostat (and/or AC/heater 824, 826) is set to the guest's preferred sleeping temperature, the "do not disturb" is set, and the lights gently dim off. When that person then wakes up they may say, "Good Morning", and the lights 822 turn on and the TV 816 turns on to their favourite TV station. Embodiments such as FIG. 8 enable the guest to do all this without having to touch anything that is not already the guest's and doing it all from the user's own device 802 that they trust. The result is like having two-hundred different houses in one place that a user's phone or other device 802 could interact with and the user has no need to set up or otherwise manually link their guest device 802 to any of the in-room devices 816, 818, 820, 822, 824, 826 within each of the guest rooms 830 as the user travels to different locations. The system of FIG. 8 automatically detects that the user is located at the hotel 800 from central authentication 600 or even global position system (GPS) coordinates on the user's device 802 or other means. The system automatically detects that the user is associated with a particular guest room 830 from the PMS's 808 room bookings 832, and then looks up the various in-room devices that are associated with that room 830 from the room-to-device table 834.

Any desired voice command scripts such may be user customized or provided to all users as desired. For example, a "Hey Siri, Movie time" command may dim the lights 822, close the blinds, and turn the TV on to the pay-per-view movie selection channel. Users may be enabled to record sequences of commands and store them as a macro and/or tag sequences of commands to any voice command. These may be stored within the user's guest preferences in the hotel guest services 602 account such as within a loyalty program user profile for the guest. The guest may then access these macros at any hotel 800 as they travel to different places during vacation or business or even at home.

Figure 9:
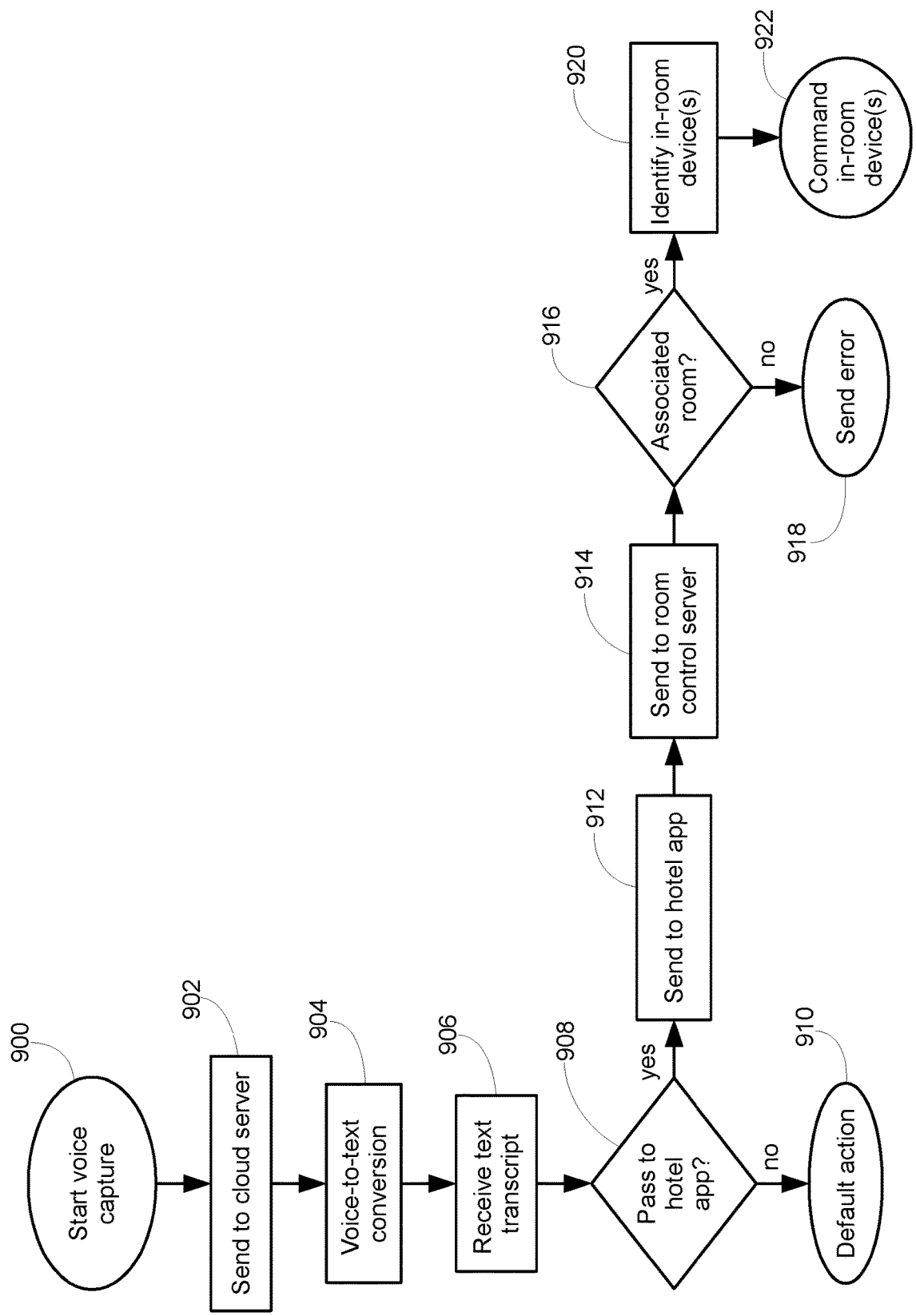
FIG. 9 shows a flowchart of a method of controlling a guest room using voice commands according to an exemplary embodiment.

FIG. 9 shows a flowchart of a method of controlling a guest room 830 using voice commands according to an exemplary embodiment. The steps of FIG. 9 may be performed by the processors of the user's guest device 802, the data gate 200, and the hotel app server 812 for instance, and may be in conjunction with optional input from the user in the form of voice or other UI commands or other processes of computer devices in the system. The steps of the flowchart are not restricted to the exact order shown, and, in other configurations, shown steps may be omitted or other intermediate steps added.

At step 900, the process beings upon the guest device 802 starting a voice capture process. For instance, this may be done by the guest device 802 detecting a predetermined voice capture trigger phrase such a "Hey Siri" for an Apple device. Alternatively, this may occur in response to the user pressing a particular button or otherwise manually activating a voice capture function on the guest device 802. The user device captures the voice audio from a microphone of the guest device 802 and stores a resulting audio file within a memory of the guest device 802.

At step 902, the guest device 802 sends the audio file to a cloud-based voice-to-text server 838. This step may correspond to the default action of a factory-included voice command processor built in to the guest device 802. For instance, Siri on an Apple device will automatically send captured audio files to an Apple-provided voice-to-text server 838.

At step 904, the voice-to-text server 838 converts the received audio file into corresponding text. The voice-to-text server 838 may have separate parameters and decoding options associated with each user. In this way, the guest device 802 will appear to get better and better at recognizing and decoding a particular user's voice the more that user utilizes the voice capture functionality. After conversion to text, the voice-to-text server 838 sends the text transcript down to the guest device 802 from which the corresponding audio file was originally received.

At step 906, the guest device 802 receives the text transcript from the voice-to-text server 838.

At step 908, the guest device 802 determines whether the text should be passed to a hotel app on the guest device 802 and/or elsewhere on the network. In some embodiments, the voice command text is only passed to the hotel app when the user is currently checked into a compatible hotel 800. For instance, upon check-in to guest room 830, the PMS 808 may send a message to the user's guest device 802 informing a hotel app running on the guest device 802 that the user is now checked in to the hotel 800. The hotel app running on the guest device 802 then registers itself with Siri as a voice controlled app to which future voice command text transcripts should be passed. Thereafter, Siri will automatically pass received text transcripts to the hotel app on the guest device 802. After the guest checks out of guest room 830, the PMS 808 may send a message to the hotel app running on the guest device 802 that the user has now checked out. The hotel app then dynamically unregisters itself from Siri so that future text transcripts are not passed to the hotel app. A similar process may also be performed on non-Apple devices. In general, a hotel app running on the guest device 802 simply registers itself to receive text transcripts of voice commands in response to receiving a first message or other notification that the user has checked in to a compatible hotel 800, and then unregisters itself to receive text transcripts in response to receiving a second message or other notification that the user has checked out of the hotel 800. Again, messages sent to/from the guest device 802 from the PMS 808 (and/or other systems) may be passed via data gate 200 to ensure easy integration between different systems regardless of interface types or changes of formatting of other systems over time.

In some embodiments, the decision of whether to pass the text record to the hotel app at step 908 can be based upon an authentication result of the hotel app and/or another service at the hospitality establishment 800. For instance, after the user of the guest device 802 successfully authenticates for Internet access at the HSIA controller 204, the HSIA controller 204 may send or otherwise trigger a first message being sent to the hotel app running on the guest device 802 to register itself for receiving voice command text records. Upon the user's Internet access expiring, the HSIA controller 204 may then send or otherwise trigger a second message being sent to the hotel app running on the guest device 802 to deregister itself for receiving voice command text records. In this way, the result of step 908 will be "yes" whenever the guest device 802 is authorized to access the Internet 836 from the hotel's guest LAN 804. A similar process can also be utilized to enable passing voice command text records to the hotel app at step 908 whenever the user is logged in to any service at the hotel 800. For example, if the user purchases bandwidth to stream Netflix to their in-room TV 816, for the period of time that this service is enabled, the answer to step 908 may be "yes".

Likewise, the hotel app on the guest device 802 may monitor to what computer network it is connected and then register itself and/or deregister itself to receive text records in response to determining the guest device is connected to the computer network of a compatible hotel 800. For instance, the guest device 802 in FIG. 8 may automatically detect that it is connected to a known hotel's guest LAN 804 and therefore register the hotel app to receive text transcripts of voice commands. Once the guest device 802 disconnects from the guest LAN 804, the hotel app is automatically deregistered so it won't receive text records. Detecting whether the guest device 802 is connected to a particular computer network may be performed in some embodiments by providing one or more services only on the LANs of compatible computer networks. For example, the hotel app may query the connected LAN using a protocol such as the multicast Domain Name System (mDNS) protocol looking for a specific service only found on compatible hotel LANs.

Other ways of configuring the guest device 802 to pass text records to the hotel app may also be performed according to different embodiments. For instance, the hotel app running on the guest device 802 can register and unregister itself to receive text transcripts in response to the current GPS location of the guest device 802 corresponding with the known location of a compatible hotel. The hotel app on the guest device 802 may include a plurality of coordinates of compatible hotels and will trigger the registration upon the location of the guest device 802 moving within a threshold proximity of a compatible hotel. This may be beneficial for compatibility with establishments that do not require guests to check in/out, for example.

In yet other examples, the voice command and/or its corresponding text transcript may be utilized at step 908 to determine whether to forward the text to the hotel app. For instance, if the voice command includes the name of the hotel app, then the text record will be passed to the hotel app. Examples of this include voice commands and corresponding transcripts such as, "Hey Siri, use the Hotel App to turn on the lights" and "Hey Siri, turn on the lights using the Hotel App.". Of course, the term "Hotel App" in the above examples could be changed to any brand-specific or other predetermined phrase in actual deployments.

In yet other configurations, Bluetooth detection of a controllable in-room device 816, RFID detection of the proximity to a room 830 or an in-room device 822, or direct WiFi to an in-room device 818 may be utilized for automatic registration or enabling passing text transcripts to the hotel app at step 908.

Any combination and permutation of the above examples and embodiments may be utilized to decide at step 908 whether to enable a guest device's 802 room control functionality for the hotel room 830.

At step 910, the text transcript is simply processed by the guest device 802 in the normal manner as it would be without the involvement of the hotel app. For instance, Siri may already be preconfigured to work with lights or other controllable devices in the user's home. Step 910 just acts as the regular process, i.e., the default action(s) of voice commands by the guest device 802. In this way, when the hotel room control functionality is enabled (i.e., "yes" branch of step 908), the user's voice commands captured by the guest device 802 will operate the lights 822 and other in-room devices 816, 818, 820, 822, 824, 826 in the guest's assigned hotel room 830; however, when the hotel room control functionality is not enabled (i.e., "no" branch of step 908), the user's voice commands captured by the guest device 802 will operate other preconfigured lights and controllable devices outside of the hotel 800 such as those installed in the user's home or office.

At step 912, the guest device 802 passes the text transcript to the hotel app. Assuming the hotel app is running on the guest device 802, this may involve Siri or another voice assistant running on the guest device 802 internally passing the text record via any predetermined application programming interface (API). For instance, Siri or another voice assistant may be preconfigured to pass text from voice commands to any number of registered apps on the guest device 802. In some embodiments, the hotel app or a portion of the app may be running on another device such as on the hotel app server 812 and this step involves the guest device 802 sending the text record to the other device (e.g., hotel app server 812) via the guest LAN 804 and/or the Internet 836.

At step 914, the hotel app (running on either the guest device 802 and/or another device such as the hotel app server 812) sends a message with a command corresponding to the text transcript along with user information to the room controller 820. For example, assuming the text records corresponds to the voice command "turn on the TV", the hotel app will send a command corresponding to turning on the TV along with a user identifier associated with the guest device 802 from which the voice command text transcript was received.

At step 916, the room controller 820 checks the room bookings 832 to confirm that the identified user is indeed currently registered in a particular guest room 830 of the hotel 800. For example, this may be done by the room controller 820 searching the room bookings 832 to find a room identifier currently associated with the user identifier received at step 914. Assuming a valid room 830 is found, control proceeds to step 920; otherwise, if no room is found, control proceeds to step 918.

At step 918, because no valid room is found, the room controller 820 sends back an error message to the hotel app and/or to an association process/server or other control server. The error message may specify the problem and require the user of the guest device 802 or other servers in the system to take specific action to fix the problem such as re-authenticating, rechecking in to the room 830, re-pairing the guest device 802 with a particular room 830, attempting an auto-authentication or auto-pairing process, and/or purchasing more HSIA Internet access time, for example.

At step 920, the room controller 820 checks the room-to-device table 834 in order to determine the specific network address(es) of one or more target in-room controllable devices that are required to complete the action specified by the voice command text transcript received by the room controller at step 914. For instance, assuming the guest's room 830 is "room 101" and the command is "turn on the TV", the room controller 820 may search the room-to-device table to find the Internet Protocol (IP) address of the TV 816 in "room 101". For more complicated commands such as "good night", the room controller 820 may need to find the IP addresses of a plurality of in-room devices 816, 818, 820, 822, 824, 826 of "room 101" in order to send all the network messages required to perform the script that corresponds to the voice command. Examples include turning off the TV 816 and STB 816, turning off the lights 822, and setting the thermostat to a desired temperature.

At step 922, the room controller 820 sends one or more network messages to the IP addresses found at step 920 in order to cause each of the target in-room controllable devices 816, 818, 820, 822, 824, 826 of the target room to perform the actions required to carry out the voice command. This step may involve the room controller 820 sending IP datagrams and/or opening TCP connections with the various devices and sending commands. It may also involve the room controller 820 operating a web-based interface of the target controllable device. As the actions required for a room controller 820 to effect commands and control one or more target controllable devices are well-known in the art, further details of this step are omitted herein for brevity.

According to some embodiments of the invention, a universal data gate 200 converts between interface format types of interconnected systems. The data gate 200 learns new interface types and greatly simplifies the requirement for a human user to reprogram the new interface types. A library of known interface types is built up over time and allows re-use of known interface types as required.

According to some embodiments of the invention, voice based room control is enabled by automatically activating the voice control on a guest device 802 when the guest is checked in to a hotel room 830. Text corresponding to voice commands captured from the user's voice is passed to a hotel app. The system automatically pairs the guest device 802 with the user's assigned room 830 and determines which in-room controllable devices are to be operated by the user's voice commands. When the user switches to a new guest room during travel, the system automatically updates the room pairing and new voice commands operate the new in-room devices.

Although the invention has been described in connection with preferred embodiments, it should be understood that various modifications, additions and alterations may be made to the invention by one skilled in the art without departing from the spirit and scope of the invention. For example, although the above-description has focused on a hotel for illustration purposes, the present invention is equally applicable to any hospitality related location or service including but not limited to hotels, motels, resorts, hospitals, apartment/townhouse complexes, restaurants, retirement centers, cruise ships, busses, airlines, airports, shopping centers, passenger trains, libraries, coffee shops, hotspots, etc. Additionally, in addition to the above described hospitality examples, the invention is applicable outside the hospitality industry such as at a home or corporate environment.

Although the above flowchart of FIG. 9 and related description was described in conjunction with a hotel app running on the guest device 802, it is not a requirement that the guest device 802 must run a hotel specific application to perform the receipt of text records at step 906. In other embodiments, the functionality described herein as being performed by the hotel app could instead be built in to the operating system or be included in another application running on the guest device 802 such as the Siri application or other voice assistants. Likewise, the hotel app equivalent functionality is not limited to be being performed on only the guest device 802. For instance, the decision of step 908 could be moved from the guest device 802 to any other network location such as being performed by the cloud-based voice-to-text server 838. Likewise, other steps of FIG. 9 may be moved to be performed on a computer server such as the hotel app server 812, for example.

In another example of a modification of FIG. 9, in some embodiments, the text transcript of voice commands received at step 906 are always passed to hotel app, i.e., the output of step 906 proceeds directly to step 912. However, the hotel app only utilizes the text command if one of the conditions described above for step 908 is true. In other words, the decision of "pass to hotel app?" step 908 is moved to after step 912 and is renamed something like, "hotel app active?" If the hotel app is active such as because the user is currently checked in to the hotel, then the flowchart will proceed to step 914; otherwise, the hotel app can just send the text record to the default app (i.e., default action step 910).

In another example, text transcripts are always passed to the hotel app server 812 whenever the hotel app server 812 is detected on any network accessible to the guest device 802. The hotel app server 812 operates as a proxy behind the scenes, possibly in conjunction with the PMS 808 and/or other services at the hotel 800, in order to figure out which controllable devices are authorized for use by the guest device 802 (if any) and to operate those authorized controllable devices in dependence upon the user's voice commands.

In this disclosure, the term "guest device" is intended to mean any user device operated by a guest of the hospitality establishment 800. Although it is beneficial for many of the reasons described herein that the guest device 802 be owned by the user, this is not a strict requirement and the same technology could also be applied when the guest device 802 is owned or otherwise provided by the hotel. For instance, because the guest device 802 does not need to be pre-programmed in advance to work with any specific in-room devices 816, 818, 820, 822, 824, 826, the design of FIG. 8 and FIG. 9 beneficially allows the guest device 802 to be moved from room to room 830 within the establishment 800 and the system will always make sure the correct room's in-room devices 816, 818, 820, 822, 824, 826 are controlled. In other words, it is not required that the user preprogram their guest device 802 with the IP addresses or other configuration details of the specific in-room devices 816, 818, 820, 822, 824, 826. Instead, the system will just work and ensure that the voice commands control the appropriate in-room devices specific the guest's assigned hotel room 830. If the guest changes rooms 830 (or hotels 800), further voice commands will now control the new in-room devices.

This configuration free operation of guest device 802 is beneficial for individual users because their own devices such as mobile phones and computers do not need to be preprogrammed with the network addresses of their room's 830 various in-room controllable devices 816, 818, 820, 822, 824, 826. The same benefit also applies to hotel owned guest devices 802 such as a hotel-provided in-room iPad or other device. Deployment and maintenance is greatly simplified as the guest devices 802 may easily be moved from room to room at any time without requiring a complicated setup procedure to be performed by the hotel 800 each time the guest device 802 switches rooms 830. All that is required is that the system authenticate the guest device 802 and pair it with a particular room 830. If the guest device 802 is provided by the hotel 800, the authentication and pairing may be as simple as hotel staff entering a hidden configuration menu on the guest device 802 in order to enter a room number or other room identifier. From that point on, the system will recognize the guest device 802 as being paired with the new room.

In yet another example of a modification, the voice-to-text conversion of step 904 could also be done locally by a voice-to-text service provided within the guest device 802 or by a server on premise at the hospitality establishment 800. This may be beneficial in some applications for increased user privacy or when there is no connection available to the Internet 836.

Again, any of the above-described devices may be integrated with one another via the data gate 200, and it is to be understood that each of the above-described devices includes one or more processors coupled to a storage medium holding processor executable instructions. For instance, by one or more processors of the guest device 802 executing software instructions of the hotel app, the guest device 802 is made operable to perform the above-described operations of the hotel app. Likewise, by one or more processors of the data gate 200 executing software instructions from a coupled storage medium, the one or more processors are operable to perform the above-described operations of the data gate 200.

Figure 10:
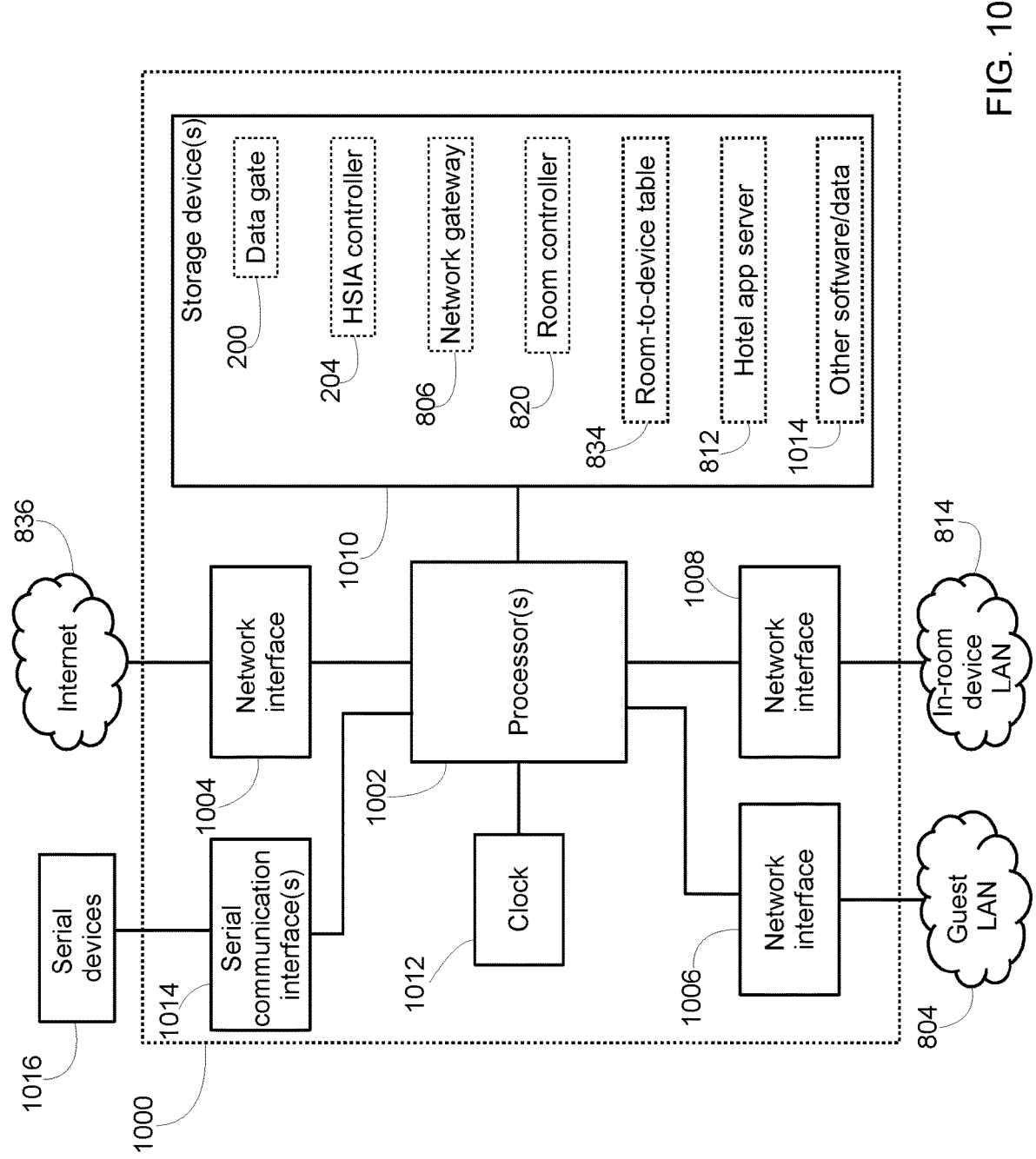
FIG. 10 illustrates a computer server merging the functionality of the data gate of FIG. 2 with room control and high speed internet access (HSIA) controllers of FIG. 8 according to an exemplary embodiment.

In yet other embodiments, the functionality of any or all of the above-described devices may be merged together. For instance, FIG. 10 illustrates a computer server 1000 including one or more processors 1002 coupled to a first network interface 1004, a second network interface 1006, a third network interface 1008, one or more storage devices 1010, and a real-time clock chip 1012. The first network interface 1004 is coupled to the Internet 836, the second network interface 1006 is coupled to the guest LAN 804, and the third network interface 1008 is coupled to the in-room device LAN 814. Especially for the data gate 200 functionalities, the server 1000 may also include any number of different types of communication interfaces in addition to network interfaces. Examples of other communication interface include serial interfaces 1016 that might be utilized by legacy serial devices 1016. Other communications interfaces may be included to support any desired wired and wireless protocols and interconnection hardware. The one or more storage devices may be implemented as a combination of hard drive(s) and random access memory, for example, and store therein a number of software modules and associated data. Specifically, the storage device(s) 1010 in this embodiment include software modules providing functions of the data gate 200, the HSIA controller 204, the network gateway 806, the room controller 820, the room-to-device table 834, and the hotel app server 812. The clock chip 1012 may be utilized to measure time such as to calculate and/or monitor expiry times for the room control functionality and/or other services provided by the server 1000.

Other software modules and data 1014 may be included as desired. For instance, in another embodiment, the data gate 200, gateway 806, PMS 808, database storage device 834, hotel app server 812 and room controller 820 may all be implemented on a single computer server 1000 in some embodiments, and the computer server 1000 located in an on premise location such a server room of the hotel 800, for example.

The above-described devices, modules, flowcharts, and other functionality may be implemented by software executed by one or more processors operating pursuant to instructions stored on a tangible computer-readable medium such as a storage device to perform the above-described functions of any or all aspects of the access controller. Examples of the tangible computer-readable medium include optical media (e.g., CD-ROM, DVD discs), magnetic media (e.g., hard drives, diskettes), and other electronically readable media such as flash storage devices and memory devices (e.g., RAM, ROM). The computer-readable medium may be local to the computer executing the instructions, or may be remote to this computer such as when coupled to the computer via a computer network such as the Internet. The processors may be included in a general-purpose or specific-purpose computer that becomes any of the above-described devices as a result of executing the instructions.

In other embodiments, rather than being software modules executed by one or more processors, the above-described devices, modules, flowcharts, and other functionality may be implemented as hardware modules configured to perform the above-described functions. Examples of hardware modules include combinations of logic gates, integrated circuits, field programmable gate arrays, and application specific integrated circuits, and other analog and digital circuit designs.

Unless otherwise specified, features described may be implemented in hardware or software according to different design requirements. In addition to a dedicated physical computing device, the word "server" may also mean a service daemon on a single computer, virtual computer, or shared physical computer or computers, for example. All combinations and permutations of the above described features and embodiments may be utilized in conjunction with the invention.

What is claimed is:

1. A data gate apparatus for integrating functionalities of an interface format into a plurality of services, the data gate apparatus comprising:
   a storage device;
   a communication interface; and
   a processor coupled to the storage device and the communication interface;
   wherein, by the processor executing software instructions loaded from the storage device, the processor is operable to:
   detect a first interface format of a first of the services via the communication interface;
   in response to determining that the first interface format is different than the interface formats stored in the storage device, learn the first interface format at least by receiving a first data function from the first of the services and identifying a field in the first data function, the field representing a position in data functions having the first interface format where an information of a particular type is passed;
   associate a variable with the field, the variable representing the information of the particular type;
   store the first interface format in the storage device for future use;
   verify that the first interface format stored in the storage device is functional at least by: installing the first interface format on the data gate, generating a message in the first interface format, and sending the message in the first interface format to the first of the services wherein the message at least causes the first of the services to send a response message to the data gate;
   receive the response message via the communication interface;
   parse the response message to thereby confirm that the first interface format stored in the storage device is functional and integrable into the plurality of services.

2. The data gate apparatus of claim 1, wherein, while learning the first interface format of the first of the services, the processor is further operable to:
   receive a second data function from the first of the services via the communication interface, the second data function having the first interface format; and
   identify the field after at least determining a portion of the second data function that is different than the first data function.

3. The data gate apparatus of claim 1, wherein the data gate is deployed as a transparent proxy between the first of the services and a second of the services, the second of the services utilizing a second interface format different than the first interface format of the first of the services.

4. The data gate apparatus of claim 1, wherein when the response message is not received within a predetermined period of time, the processor is further operable to automatically relearn the first interface format.

5. The data gate apparatus of claim 1, further comprising a visual user interface that allows a user to manually map one or more fields in data functions with one or more variables.

6. The data gate apparatus of claim 1, wherein the processor is further operable to:
   receive a request for a specific data from the first of the services;
   determine that the specific data is available in a source format that is different than the first interface format of the first of the services;
   translate the specific data from the source format into the first interface format; and
   send the specific data in the first interface format to the first of the services, thereby fulfilling the request from the first of the services without the first of the services needing to know about the source format of the specific data.

7. The data gate apparatus of claim 6, wherein the request is a voice command issued by a guest of a hospitality establishment via a hotel application server coupled to the data gate.

8. The data gate apparatus of claim 1, wherein the field is selected from an array comprising a plurality of fields.

9. The data gate apparatus of claim 1, wherein, while learning the first interface format of the first of the services, the processor is further operable to:
   monitor data traffic originating from the first of the services;
   identify a plurality of changing fields in the data traffic; and map each one of the changing fields to a respective variable representing a known type of information.

10. The data gate apparatus of claim 1, wherein the processor is further operable to learn a second interface format after detecting an error while attempting to transmit network traffic to and from the second of the services.

11. A method of integrating functionalities of an interface format into a plurality of services, the method comprising:
    detecting a first interface format of a first of the services;
    in response to determining that the first interface format is different than the interface formats stored in a storage device, learning the first interface format at least by receiving a first data function from the first of the services and identifying a field in the first data function, the field representing a position in data functions having the first interface format where an information of a particular type is passed;
    associating a variable with the field, the variable representing the information of the particular type;
    storing the first interface format in the storage device for future use;
    verifying that the first interface format stored in the storage device is functional at least by: installing the first interface format on a data gate, generating a message in the first interface format, and sending the message in the first interface format to the first of the services wherein the message at least causes the first of the services to send a response message;
    receiving the response message from the first of the services;
    parsing the response message to thereby confirm that the first interface format stored in the storage device is functional and integrable into the plurality of services.

12. The method of claim 11, further comprising learning the first interface format of the first of the services by:
    receiving a second data function from the first of the services, the second data function having the first interface format; and
    identifying the field after at least determining a portion of the second data function that is different than the first data function.

13. The method of claim 11, further comprising:
    detecting a second of the services, the second of the services utilizing a second interface format different than the first interface format of the first of the services;
    receiving information from the first of the services, the first of the services designating the second of the services as a recipient of the information;
    converting the information from the first interface format to the second interface format; and
    delivering the information in the second interface format to the second of the services without the second of the services needing to understand the first interface format utilized by the first of the services.

14. The method of claim 11, further comprising automatically relearning the first interface format when the response message is not received within a predetermined period of time.

15. The method of claim 11, further comprising manually mapping one or more fields in the data functions with one or more variables via a visual user interface.

16. The method of claim 11, further comprising:
    receiving a request for a specific data from the first of the services;
    determining that the specific data is available in a source format that is different than the first interface format of the first of the services;
    translating the specific data from the source format into the first interface format; and
    sending the specific data in the first interface format to the first of the services, thereby fulfilling the request from the first of the services without the first of the services needing to know about the source format of the specific data.

17. The method of claim 16, wherein the request is a voice command issued by a guest of a hospitality establishment.

18. The method of claim 11, wherein the field is selected from an array comprising a plurality of fields.

19. The method of claim 11, further comprising learning the first interface format of the first of the services by:
    monitoring data traffic originating from the first of the services;
    identifying a plurality of changing fields in the data traffic; and
    mapping each one of the changing fields to a respective variable representing a known type of information.

20. The method of claim 11, further comprising learning a second interface format after detecting an error while attempting to transmit network traffic to and from the second of the services.

* * * * *